United States Patent
Lee et al.

(10) Patent No.: US 9,690,377 B2
(45) Date of Patent: Jun. 27, 2017

(54) MOBILE TERMINAL AND METHOD FOR CONTROLLING HAPTIC FEEDBACK

(71) Applicant: Samsung Electronics Co., Ltd., Gyeonggi-do (KR)

(72) Inventors: Ju-Youn Lee, Gyeonggi-do (KR); Jin-Hyoung Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 295 days.

(21) Appl. No.: 14/167,595

(22) Filed: Jan. 29, 2014

(65) Prior Publication Data
US 2014/0210756 A1   Jul. 31, 2014

(30) Foreign Application Priority Data

Jan. 29, 2013   (KR) .................. 10-2013-0009998

(51) Int. Cl.
  G06F 3/01     (2006.01)
  G06F 3/0488   (2013.01)
  G06F 3/0354   (2013.01)

(52) U.S. Cl.
  CPC .......... *G06F 3/016* (2013.01); *G06F 3/03545* (2013.01); *G06F 3/04883* (2013.01)

(58) Field of Classification Search
  CPC ... G06F 3/016; G06F 3/03545; G06F 3/04883
  USPC ....................................... 345/173
  See application file for complete search history.

(56) References Cited

U.S. PATENT DOCUMENTS

| | | | |
|---|---|---|---|
| 2006/0284849 A1* | 12/2006 | Grant | G06F 3/016 345/173 |
| 2008/0165141 A1* | 7/2008 | Christie | G06F 3/044 345/173 |
| 2009/0085878 A1* | 4/2009 | Heubel | G06F 3/016 345/173 |
| 2009/0216341 A1 | 8/2009 | Enkerud et al. | |
| 2009/0315834 A1* | 12/2009 | Nurmi | G06F 3/041 345/173 |
| 2010/0156818 A1* | 6/2010 | Burrough | G06F 3/016 345/173 |
| 2010/0231550 A1* | 9/2010 | Cruz-Hernandez | G06F 3/0488 345/174 |
| 2010/0267424 A1* | 10/2010 | Kim | G06F 3/016 455/566 |
| 2011/0138277 A1 | 6/2011 | Grant et al. | |
| 2012/0120002 A1* | 5/2012 | Ota | G06F 3/0488 345/173 |
| 2012/0235942 A1* | 9/2012 | Shahoian | G06F 1/1616 345/173 |
| 2012/0293464 A1* | 11/2012 | Adhikari | G06F 3/0354 345/179 |
| 2012/0306632 A1* | 12/2012 | Fleizach | G06F 3/016 340/407.2 |
| 2013/0113715 A1* | 5/2013 | Grant | G06F 3/0488 345/173 |

* cited by examiner

*Primary Examiner* — Viet Pham
(74) *Attorney, Agent, or Firm* — The Farrell Law Firm, P.C.

(57) ABSTRACT

Methods and a mobile terminal for providing visual and haptic feedback are provided. At least one first touch made to an object displayed on a touch screen is detected. The object is transformed and displayed in response to movement of the first touch. At least one second touch made to the displayed object is detected. Visual feedback is displayed on the touch screen in response to the second touch, and haptic feedback corresponding to a predetermined haptic pattern is output using a vibration motor.

29 Claims, 25 Drawing Sheets

MOBILE TERMINAL AND METHOD FOR CONTROLLING HAPTIC FEEDBACK

PRIORITY

This application claims priority under 35 U.S.C. §119(a) to a Korean patent application filed in the Korean Intellectual Property Office on Jan. 29, 2013 and assigned Serial No. 10-2013-0009998, the entire disclosure of which is incorporated herein by reference.

BACKGROUND OF THE INVENTION

1. Field of the Invention

The present disclosure relates generally to a mobile terminal, and more particularly, to a mobile terminal and method for controlling haptic

2. Description of the Related Art

In recent years, there has been a gradual increase in the number of services and add-ons (or additional features) provided by mobile terminals. In order to increase the utility of the mobile terminals and satisfy various needs of users, a wide variety of applications, which are executable in the mobile terminals, have been developed.

Accordingly, a few to hundreds of applications may be stored in a mobile terminal with a touch screen, such as, for example, a smart phone, a cellular phone, a laptop Personal Computer (PC) and a tablet PC. Objects (or shortcut icons) provided for executing their associated applications may be displayed on the touch screen of the mobile terminal. Thus, the user may execute his/her desired application on the mobile terminal by touching any one of the shortcut icons displayed on the touch screen. On the touch screen of the mobile terminal may be displayed various types of visual objects such as widgets, photos, and documents, in addition to the shortcut icons.

As such, the mobile terminal may apply, to the displayed objects, a touch input scheme that uses an input unit or a touch input unit, such as, for example, a user's finger, an electronic pen, and a stylus pen. The touch input scheme may be classified into a contact touch input scheme for allowing the user to make a contact touch between the touch screen and the user's body or the touch input unit, and a non-contact touch input scheme for allowing the user to make a non-contact touch (e.g., hovering) between the touch screen and the user's body or the touch input unit. These touch input schemes may provide convenient user interfaces.

A scheme has been used, which generates vibrations to allow the user to feel a realistic button manipulation feeling by means of a vibration device when he/she makes a touch input on the touch screen. As such, research has been conducted on various touch input technologies, and many studies have been conducted to meet the demand for interesting new multi-sensory interfaces desired by users.

As described above, a scheme has been applied, which provides vibrations through the touch screen, allowing the user to feel a manipulation feeling when manipulating the mobile terminal. This scheme merely allows the user to recognize that the input unit is in contact with the touch screen.

SUMMARY OF THE INVENTION

The present invention has been made to address at least the above problems and/or disadvantages and to provide at least the advantages described below. Accordingly, an aspect of the present invention is to provide a mobile terminal and method for controlling haptic effects when a user manipulates a user interface on the mobile terminal equipped with at least one touch screen.

In accordance with an aspect of the present invention, a method is provided for providing visual and haptic feedback in a mobile terminal. At least one first touch made to an object displayed on a touch screen is detected. The object is transformed and displayed in response to movement of the first touch. At least one second touch made to the displayed object is detected. Visual feedback is displayed on the touch screen in response to the second touch, and haptic feedback corresponding to a predetermined haptic pattern is output using a vibration motor.

In accordance with another aspect of the present invention, a mobile terminal is provided for providing visual and haptic feedback. The mobile terminal includes a vibration motor configured to output vibrations, a touch screen configured to display an object, and a controller configured to control display in response to a first touch made to the object, and to control the vibration motor to output haptic feedback corresponding to a predetermined haptic pattern in response to a second touch made to the object.

In accordance with an additional aspect of the present invention, an input unit is provided for providing haptic feedback. The input unit includes a vibration device, a short-range communication unit for receiving, from a mobile terminal, a control signal for controlling vibrations of the vibration device, and a haptic controller for controlling the vibrations of the vibration device by analyzing the received control signal. The control signal comprises a predetermined haptic pattern corresponding to visual feedback provided to an object that is transformed by movement of the input unit on a touch screen of the mobile terminal.

In accordance with a further aspect of the present invention, a method is provided for providing haptic feedback in an input unit. A control signal for controlling vibrations of a vibration device is received from a mobile terminal. The vibrations of the vibration device are controlled by analyzing the received control signal. The control signal comprises a predetermined haptic pattern corresponding to visual feedback provided to an object that is transformed by movement of the input unit on a touch screen of the mobile terminal.

BRIEF DESCRIPTION OF THE DRAWINGS

The above and other aspects, features, and advantages of embodiments of the present invention will be more apparent from the following detailed description when taken in conjunction with the accompanying drawings, in which.

DETAILED DESCRIPTION OF EMBODIMENTS OF THE PRESENT INVENTION

Figure 1:
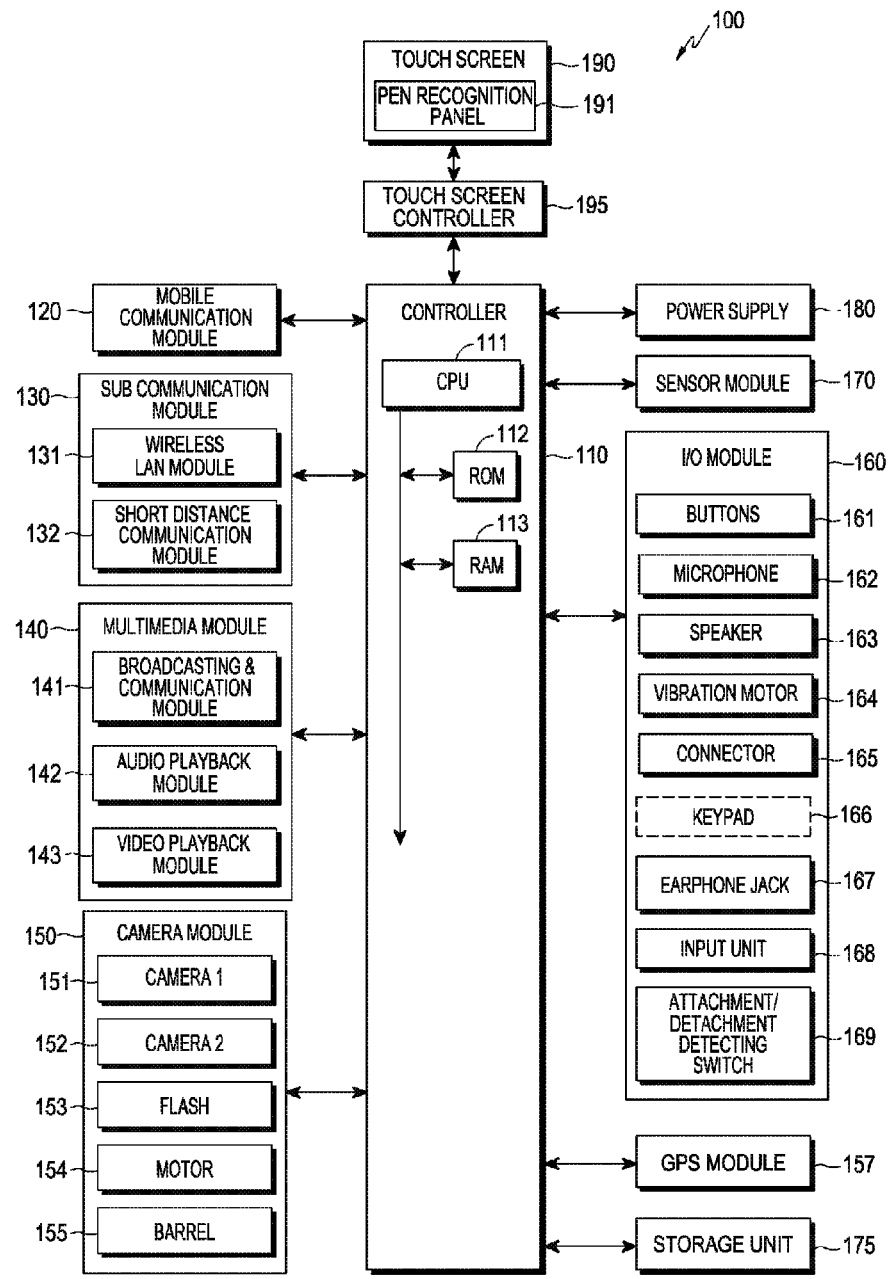
FIG. 1 is a schematic block diagram illustrating a mobile terminal providing haptic effects, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the disclosure. Accordingly, it should be apparent to those skilled in the art that the following description of embodiments of the present invention is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term 'mobile terminal' refers to a mobile terminal that a user can carry with him/her, and that can support data transmission/reception and voice/video calls, and the mobile terminal may include at least one touch screen. Such mobile terminals may include smart phones, tablet PCs, 3-Dimensional Televisions (3D-TVs), smart TVs, Light Emitting Diode (LED) TVs and Liquid Crystal Display (LCD) TVs, and may also include any terminal that can communicate with peripheral devices, or other terminals located in remote areas.

The term 'input unit' refers to at least one of a finger, an electronic pen and a stylus pen that can provide commands or inputs to a mobile terminal as the user touches a touch screen not only in a contact touch way, but also in a non-contact touch (e.g., hovering) way.

The term 'object' refers to an object that is or can be displayed on a touch screen of a mobile terminal, and such objects may include at least one of documents, widgets, photos, maps, videos, Emails, Short Message Service (SMS) messages and Multimedia Messaging Service (MMS) messages, and may be executed, deleted, canceled, stored and changed by an input unit. These objects may be construed to include shortcut icons, thumbnail images, and folders in which a mobile terminal stores at least one object.

The term 'shortcut icon' refers to a shortcut icon that is displayed on a touch screen of a mobile terminal, for fast execution of calls, contacts, menus and the like, which are provided by default in each application or the mobile terminal. Upon receiving a command or an input for executing a certain function, the mobile terminal may execute its associated application.

The term 'touch gesture' refers to an input operation of controlling display of at least one object displayed on a touch screen of a mobile terminal, using an input unit or a finger. These touch gestures may include, for example, a gesture to touch a touch screen with a finger, and then continuously touch the touch screen with the finger (or continuously move the finger) downward to display at least one object above; a gesture to touch a touch screen with a finger, and then continuously touch the touch screen with the finger (or continuously move the finger) upward to display at least one object existing beneath; a gesture to touch a touch screen with a finger, and then continuously touch the touch screen with the finger (or continuously move the finger) from the right to the left to display at least one object existing in the right side; a gesture to touch a touch screen with a finger, and then continuously touch the touch screen with the finger (or continuously move the finger) from the left to the right to display at least one object in the left side; a pinch (gesture) to touch a touch screen with two fingers, and then continuously drag in a direction of narrowing a gap between the two fingers to zoom out a displayed object; and a spread (gesture) to touch a touch screen with two fingers, and then continuously drag in a direction of widening a gap between the two fingers to zoom in a displayed object. Due to the aforementioned gestures, an object displayed on a touch screen may be scrolled, zoomed out, or zoomed in, and at least one side of the displayed object may be transformed to be concave or convex.

FIG. 1 is a schematic block diagram illustrating a mobile terminal providing haptic effects, according to an embodiment of the present invention.

Referring to FIG. 1, a mobile terminal 100 may be connected to external devices using at least one of a mobile communication module 120, a sub-communication module 130, a connector 165, and an earphone jack 167. The external devices may include a variety of devices, such as, for example, earphones, external speakers, Universal Serial Bus (USB) memories, chargers, cradles/docks, Digital Multimedia Broadcasting (DMB) antennas, mobile payment-related devices, health care devices (e.g., blood glucose meters and the like), game consoles, and car navigation devices, all of which can be detachably connected to the mobile terminal 100 by wires. In addition, the external devices may include Bluetooth devices, Near Field Communication (NFC) devices, WiFi Direct devices and wireless Access Points (APs), all of which can be wirelessly connected to the mobile terminal 100. The mobile terminal 100 may be connected to other devices (e.g., cellular phones, smart phones, tablet PCs, desktop PCs, and servers) by wires or wirelessly.

The mobile terminal 100 includes at least one touch screen 190 and at least one touch screen controller 195. In addition, the mobile terminal 100 includes a controller 110, the mobile communication module 120, the sub-communication module 130, a multimedia module 140, a camera module 150, a Global Positioning System (GPS) module 157, an Input/Output (I/O) module 160, a sensor module 170, a storage unit 175, and a power supply 180.

The sub-communication module 130 includes at least one of a Wireless Local Area Network (WLAN) module 131 and a short-range communication module 132. The multimedia module 140 includes at least one of a broadcasting & communication module 141, an audio playback module 142, and a video playback module 143. The camera module 150 includes at least one of a first camera 151 and a second camera 152. Depending on the main purposes of the mobile terminal 100, the camera module 150 of the mobile terminal 100 also includes at least one of a barrel 155 used for zoom in/out of the first and/or second cameras 151 and 152, a motor 154 for controlling movement of the barrel 155, and a flash 153 for providing a light source for capturing an image. The I/O module 160 includes at least one of a button(s) 161, a microphone 162, a speaker 163, a vibration motor 164, the connector 165, a keypad 166, the earphone jack 167, an input unit 168, and an attachment/detachment detecting switch 169.

The controller 110 includes a Central Processing Unit (CPU) 111, a Read Only Memory (ROM) 112 storing a control program for control of the mobile terminal 100, and a Random Access Memory (RAM) 113 that temporarily stores the signals or data input from the outside of the mobile terminal 100, or is used as a workspace for operations performed in the mobile terminal 100. The CPU 111 may include a single-core CPU, a dual-core CPU, a triple-core CPU, or a quad-core CPU. The CPU 111, the ROM 112 and the RAM 113 may be interconnected through an internal bus.

The controller 110 may control the mobile communication module 120, the sub-communication module 130, the multimedia module 140, the camera module 150, the GPS module 157, the I/O module 160, the sensor module 170, the storage unit 175, the power supply 180, the touch screen 190, and the touch screen controller 195.

The controller 110 may determine whether hovering is recognized as the touch input unit 168, such as, for example, an electronic pen, approaches any one object while a plurality of objects are displayed on the touch screen 190, and may identify an object corresponding to the position where the hovering has occurred. The controller 110 may detect a height spanning from the mobile terminal 100 (to be specific, the upper surface of the mobile terminal 100) to the input unit 168, and a hovering input event corresponding to the height. The hovering input event may include at least one of a gesture to press a button formed on the input unit 168, a gesture to tap on the input unit 168, a gesture to move the input unit 168 faster than a predetermined speed, and a gesture to touch an object. A haptic pattern may be set differently depending on the distance between the input unit 168 and the touch screen 190. If a hovering input event occurs, the controller 110 may display preset hovering input effects corresponding to the hovering input event on the touch screen 190.

The controller 110 may display at least one object by controlling the touch screen 190. Upon detecting a touch gesture made by the input unit 168 on the touch screen 190, the controller 110 may move an object displayed on the touch screen 190 up, down, left or right, or may zoom in or out the displayed object in response to the touch gesture. If the touch gesture corresponds to hovering by the input unit 168, the controller 110 may calculate a distance between the touch screen 190 and the input unit 168, and control an object display speed of the touch screen 190 in response to the calculated distance. If the touch gesture corresponds to a scrolling input, the controller 110 may form or transform at least one side of at least one object existing in the uppermost side, the lowermost side, the rightmost side, or the leftmost side to be concave or convex, or may provide visual feedback such as, for example, vibrating effects and rippling effects (in which the rippling strength may gradually decrease over time), and control the vibration motor 164 mounted in the mobile terminal 100.

The mobile communication module 120, under control of the controller 110, may connect the mobile terminal 100 to the external devices by mobile communication using at least one antenna. The mobile communication module 120 may transmit and receive wireless signals for voice calls, video calls, SMS messages, or MMS messages to/from a cellular phone, a smart phone, a tablet PC, or other devices, phone numbers of all of which are registered in the mobile terminal 100.

The sub-communication module 130 may include at least one of the WLAN module 131 and the short-range communication module 132. For example, the sub-communication module 130 may include any one or both of the WLAN module 131 and the short-range communication module 132.

The WLAN module 131, under control of the controller 110, may access the Internet in the place where a wireless AP is installed. The WLAN module 131 may support the WLAN standard IEEE802.11x proposed by Institute of Electrical and Electronics Engineers (IEEE). The short-range communication module 132, under control of the controller 110, may wirelessly perform short-range communication between the mobile terminal 100 and an image forming apparatus. The short-range communication scheme may include, for example, Bluetooth, Infrared Data Association (IrDA), WiFi-Direct, NFC and the like.

The controller 110 may transmit a control signal corresponding to a haptic pattern to the input unit 168 through at least one of the WLAN module 131 and the short-range communication module 132 in the sub-communication module 130.

Depending on its performance, the mobile terminal 100 may include at least one or a combination of the mobile communication module 120, the WLAN module 131, and the short-range communication module 132. In an embodiment of the present invention, at least one or a combination of the mobile communication module 120, the WLAN module 131, and the short-range communication module 132 will be referred to as a transceiver, but it is not intended to limit the scope of the disclosure thereto.

The multimedia module 140 may include the broadcasting & communication module 141, the audio playback module 142, or the video playback module 143. The broadcasting & communication module 141, under control of the controller 110, may receive broadcast signals (e.g., TV broadcast signals, radio broadcast signals, or data broadcast signals) and additional broadcast signals (e.g., Electric Program Guide (EPS) or Electric Service Guide (ESG)), which are sent from broadcasting stations, via a broadcasting & communication antenna. The audio playback module 142, under control of the controller 110, may play stored or received digital audio files (with an extension of, for example, mp3, wma, ogg or wav). The video playback module 143, under control of the controller 110, may play stored or received digital video files (with an extension of, for example, mpeg, mpg, mp4, avi, mov, or mkv). The video playback module 143 may play the digital audio files as well.

The multimedia module 140 may include the audio playback module 142 and the video playback module 143, and not the broadcasting & communication module 141. The audio playback module 142 or the video playback module 143 in the multimedia module 140 may be incorporated into the controller 110.

The first camera 151 of the camera module 150 may be disposed on the front of the mobile terminal 100, and the second camera 152 may be disposed on the rear of the mobile terminal 100. Alternatively, both of the first and second cameras 151 and 152 may be mounted on the front of the mobile terminal 100 to be adjacent to each other (with a gap between them being greater than 1 cm, for example, and less than 8 cm, for example), making it possible to shoot 3D images or videos.

Each of the first and second cameras 151 and 152 may include a lens system, an image sensor and the like. Each of the first and second cameras 151 and 152 may convert an optical image signal received through (or captured by) the lens system into an electrical image signal, and output the electrical image signal to the controller 110, and the user may shoot videos or still images using the first and second cameras 151 and 152.

The GPS module 157 may receive radio waves from a plurality of GPS satellites, and calculate the location of the mobile terminal 100 using the Time of Arrival (ToA) of radio waves from the GPS satellites to the mobile terminal 100.

Components of the I/O module 160 may not be limited, and cursor control units such as mouse, trackball, joystick and cursor arrow keys may be provided to control movement of a cursor on the touch screen 190 through communication with the controller 110.

The buttons 161 of the I/O module 160 may be formed on the front, side or rear of a housing of the mobile terminal 100, and may include, for example, at least one of a Power/Lock button, a Volume button, a Menu button, a Home button, a Back button, and a Search button.

The microphone 162 of the I/O module 160, under control of the controller 110, may generate electrical signals by receiving voices or sounds.

The speaker 163 of the I/O module 160, under control of the controller 110, may output sounds corresponding to a variety of signals (e.g., wireless signals, broadcast signals, digital audio files, digital video files, photo-shooting sounds, or the like) from the mobile communication module 120, the sub-communication module 130, the multimedia module 140 or the camera module 150, to the outside of the mobile terminal 100. The speaker 163 may output the sounds corresponding to a control signal that is transmitted to the input unit 168 through the short-range communication module 132. The sounds corresponding to the control signal may include the sound corresponding to activation of a vibration device 520 (see FIG. 5) in the input unit 168, the sound whose intensity varies depending on the vibration intensity, and the sound corresponding to deactivation of the vibration device 520. The speaker 163 may output the sounds corresponding to at least one of visual feedback and haptic feedback for an object displayed on the touch screen 190. These sounds corresponding to at least one of visual feedback and haptic feedback may include vibrating or rippling sounds, which are generated when objects are scrolled, or any one of a plurality of scrolled objects is selected, or generated when objects are zoomed in, zoomed out, or scrolled up or down, and the speaker 163 may output the sounds corresponding to thereto. For these sounds, their volume may be controlled depending on the vibration intensity of the vibration device 520 in the input unit 168, and the sounds may be output through the speaker 163 in the mobile terminal 100 and/or a speaker 560 mounted in the input unit 168 at the time of activation of the vibration device 520, or before/after a lapse of a predetermined time (e.g., 10 ms). The sounds may be terminated at the time of deactivation of the vibration device 520, or before/after a lapse of a predetermined time (e.g., 10 ms). In addition, the speaker 163 may output the sounds (e.g., button manipulation tones or ring back tones for calls) corresponding to the functions executed by the mobile terminal 100. One or multiple speakers 163 may be formed in a proper position or positions of the housing of the mobile terminal 100.

The vibration motor 164 of the I/O module 160, under control of the controller 110, may convert electrical signals into mechanical vibrations. For example, upon receiving a voice call from another device, the mobile terminal 100 in a vibration mode may activate or enable the vibration motor 164. One or multiple vibration motors 164 may be formed in the housing of the mobile terminal 100. The vibration motor 164 may operate or may be enabled in response to a user's gesture to touch the touch screen 190, and a user's gesture to continuously move (or drag) the touch on the touch screen 190. The vibration motor 164 may vibrate in haptic feedback corresponding to the feeling (e.g., vibrating feeling, rippling feeling and the like) that the user feels. The haptic feedback may be the same or different depending on whether objects are scrolled, whether any one of scrolled multiple objects is selected, whether the selected object is zoomed in or zoomed out, or whether objects are scrolled up or down. The vibration motor 164 may vibrate in response to the haptic feedback.

The connector 165 of the I/O module 160 may be used as an interface for connecting the mobile terminal 100 to external devices or a power source. The mobile terminal 100, under control of the controller 110, may transmit the data stored in the storage unit 175 of the mobile terminal 100 to external devices or receive data from the external devices, through a wired cable connected to the connector 165. The mobile terminal 100 may receive power from a power source or charge its rechargeable battery using the power source, through a wired cable connected to the connector 165.

The keypad 166 of the I/O module 160 may receive key inputs from the user, for control of the mobile terminal 100. The keypad 166 may include a physical keypad formed on the mobile terminal 100 or a virtual keypad displayed on the touch screen 190. The physical keypad formed on the mobile terminal 100 is optional depending on the performance or structure of the mobile terminal 100.

An earphone may be inserted in the earphone jack 167 of the I/O module 160 and connected to the mobile terminal 100. The input unit 168 of the I/O module may be kept inside the mobile terminal 100 after being inserted therein, and may be pulled out or detached from the mobile terminal 100 during its use. In a specific area inside the mobile terminal 100, in which the input unit 168 is inserted, may be mounted an attachment/detachment detecting switch 169 that operates in response to the attachment/detachment of the input unit 168. The attachment/detachment detecting switch 169 may provide a signal corresponding to the attachment and detachment of the input unit 168 to the controller 110. The attachment/detachment detecting switch 169 may be prepared in a specific area in which the input unit 168 is inserted, and provided to be in direct or indirect contact with the input unit 168 when the input unit 168 is attached to or inserted in the mobile terminal 100. Accordingly, based on its direct/indirect contact with the input unit 168, the attachment/detachment detecting switch 169 may generate a signal corresponding to the attachment/detachment of the input unit 168, and provide the generated signal to the controller 110.

The sensor module 170 may include at least one sensor for detecting the status of the mobile terminal 100. For example, the sensor module 170 may include at least one of a proximity sensor for detecting the user's proximity to the mobile terminal 100, an ambient light sensor for detecting the amount of light in the vicinity of the mobile terminal 100, a motion sensor for detecting a motion (e.g., rotation, acceleration or vibration) of the mobile terminal 100, a geo-magnetic sensor for detecting the point of the compass using the Earth's magnetic field, a gravity sensor for detecting the direction in which the gravity is applied to the mobile terminal 100, and an altimeter for detecting the altitude by measuring the atmosphere pressure. At least one sensor may detect the status of the mobile terminal 100, generate a signal corresponding to the detected status, and provide the signal to the controller 110. These and other sensors for the sensor module 170 may be added or removed depending on the performance of the mobile terminal 100.

The storage unit 175, under control of the controller 110, may store the signals or data which are input or output to correspond to operations of the mobile communication module 120, the sub-communication module 130, the multimedia module 140, the camera module 150, the GPS module 157, the I/O module 160, the sensor module 170, the touch screen 190. The storage unit 175 may store a control program for control of the mobile terminal 100 or the controller 110, and a variety of applications.

The term 'storage unit' may be construed to include the storage unit 175, the ROM 112 and the RAM 113 in the controller 110, or a memory card (e.g., a Secure Digital (SD) card and a memory stick) mounted in the mobile terminal

100. The storage unit may include non-volatile memory, volatile memory, Hard Disk Drive (HDD), or Solid State Drive (SSD).

The storage unit 175 may store applications of various features, such as, for example, navigation applications, video call applications, game applications and alarm applications; images for providing their associated Graphical User Interfaces (GUIs); databases or data related to the ways to handle user information, documents and touch inputs; background images (menu screens, standby screens and the like) needed to drive the mobile terminal 100, or operational programs; and images captured by the camera module 150. Further, the storage unit 175 may store haptic patterns corresponding to the feelings (e.g., vibrating feeling, rippling feeling and the like) that the user feels. The storage unit 175 may be a machine-readable medium (e.g., computer-readable medium), and the term 'machine-readable medium' may be defined as a medium that provides data to a machine so that the machine may perform a specific function. The machine-readable medium may be a storage medium. The storage unit 175 may include non-volatile media and volatile media. All of these media should be configured to make it possible to detect commands carried by the media by means of a physical mechanism that reads the commands into the machine.

The machine-readable medium may, though not limited to, include at least one of floppy disk, flexible disk, hard disk, magnetic tape, Compact Disc Read-Only Memory (CD-ROM), optical disk, punch card, paper tape, RAM, Programmable Read-Only Memory (PROM), Erasable PROM (EPROM), and FLASH-EPROM.

The power supply 180, under control of the controller 110, may supply power to one or more rechargeable batteries mounted in the housing of the mobile terminal 100. The one or more rechargeable batteries may supply power to the mobile terminal 100. The power supply 180 may supply, to the mobile terminal 100, the power that is received from an external power source via a wired cable connected to the connector 165. The power supply 180 may supply, to the mobile terminal 100, the power that is wirelessly received from an external power source using wireless charging technology.

The mobile terminal 100 may include at least one touch screen 190 that provides the user with user interfaces corresponding to various services (e.g., calls, data transfer, broadcasting, photo shooting and the like). Each touch screen 190 may transfer an analog signal corresponding to at least one touch made on a user interface to its associated touch screen controller 195. As such, the mobile terminal 100 may include a plurality of touch screens, and may also include their associated touch screen controllers that receive analog signals corresponding to touches made on the associated touch screens. These touch screens may be mounted on a plurality of housings separately through a hinge connection, or may be mounted on a single housing without the hinge connection. As described above, the mobile terminal 100, according to an embodiment of the present invention, may include at least one touch screen. However, it will be assumed that the mobile terminal 100 includes one touch screen 190 for convenience purpose only.

The touch screen 190 may receive at least one touch through the user's body (e.g., fingers including the thumb) or a touch input unit (e.g., a stylus pen and an electronic pen). The touch screen 190 may include a pen recognition panel 191 that recognizes an input made by a pen such as a stylus pen or an electronic pen, and the pen recognition panel 191 may determine the distance between the pen and the touch screen 190 based on a magnetic field. The touch screen 190 may receive a continuous movement of any one of at least one touch. The touch screen 190 may transfer an analog signal corresponding to the received continuous movement of a touch to the touch screen controller 195.

In an embodiment of the present invention, the touch may not be limited to a contact touch between the touch screen 190 and the user's body or the touch input unit, but may include a non-contact touch between the touch screen 190 and the user's body or the touch input unit (with a detectable gap between them being set to, for example, about 5 mm). The gap detectable by the touch screen 190 may be subject to change depending on the performance or the structure of the mobile terminal 100. The touch screen 190 may be configured to differently output values (e.g., analog voltage values or current values) detected by a touch event (or a contact touch event) and a hovering event (or a non-contact touch event), to make it possible to separately detect the touch event and the hovering event between the touch screen 190 and the user's body or the touch input unit. Preferably, the touch screen 190 may differently output the detected values (e.g., current values and the like) depending on the distance between the touch screen 190 and the space where the hovering event occurs.

The touch screen 190 may be implemented in, for example, a resistive type, a capacitive type, an infrared type, or an acoustic wave type.

The touch screen 190 may include at least two touch screen panels capable of detecting each of a touch thereon and a proximity thereto by the user's body and the touch input unit, to make it possible to sequentially or simultaneously receive inputs by the user's body and the touch input unit. The at least two touch screen panels may provide different output values to the touch screen controller 195, and the touch screen controller 195 may differently recognize the values received from the at least two touch screen panels, and determine whether the input from the touch screen 190 is an input by the user's body, or an input by the touch input unit. The touch screen 190 may display at least one object. In addition, the touch screen 190, under control of the controller 110, may display bounce effects or a visual feedback (e.g., vibrating effects, rippling effects and the like), when the user desires to display at least one object existing in the uppermost side, the lowermost side, the leftmost side or the rightmost side by scrolling objects using the input unit 168.

More specifically, the touch screen 190 may be configured in a structure in which a panel for detecting a non-contact input (or a hovering input) by the finger or the input unit 168 based on a change in induced electromotive force and a panel for detecting a physical contact with the touch screen 190 by the finger or the input unit 168 may be sequentially stacked to be in contact with each other, or to be partially spaced apart from each other. The touch screen 190 may include a plurality of pixels, and display images on the pixels. The touch screen 190 may use, as its display panel, a Liquid Crystal Display (LCD) panel, an Organic Light Emitting Diodes (OLED) panel, or a Light Emitting Diodes (LED) panel.

The touch screen 190 may include a plurality of sensors for detecting the position where the finger or the input unit 168 is in contact with the surface of the touch screen 190, or is put on or over the touch screen 190, keeping a certain distance from the touch screen 190. Each of the plurality of sensors may be formed in a coil structure, and a sensor layer formed of a plurality of sensors may have patterns on which the sensors are set up in advance, and may have a plurality of electrode lines formed thereon. Due to this structure, if a contact or hovering input occurs on the touch screen 190 by the finger or the input unit 168, the touch screen 190 may generate a detection signal whose waveform is changed based on a capacitance between the sensor layer and the input means. The touch screen 190 may transfer the generated detection signal to the controller 110. The distance between the input unit 168 and the touch screen 190 may be determined based on the strength of a magnetic field formed by a coil 510 (see FIG. 5). A process of setting the vibration intensity will be described in greater detail below.

The touch screen controller 195 may convert an analog signal received from the touch screen 190 into a digital signal (e.g., X and Y coordinates), and transfer the digital signal to the controller 110. The controller 110 may control the touch screen 190 using the digital signal received from the touch screen controller 195. For example, the controller 110 may select or execute a shortcut icon or an object displayed on the touch screen 190 in response to a touch event or a hovering event. The touch screen controller 195 may be incorporated into the controller 110.

The touch screen controller 195 may determine the distance between the touch screen 190 and the space where the hovering event occurs, by detecting the values (e.g., current values and the like) output from the touch screen 190, and may convert the determined distance value into a digital signal (e.g., Z coordinates), and provide the digital signal to the controller 110.

Figure 2:
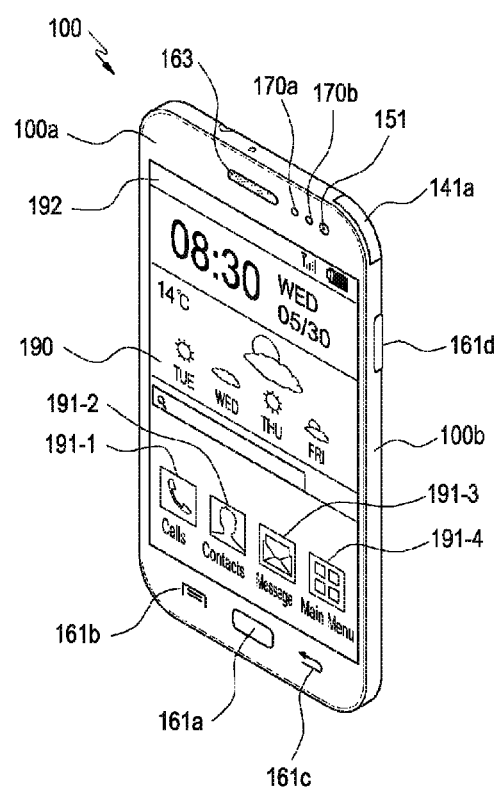
FIG. 2 is a diagram illustrating a front perspective view of a mobile terminal, according to an embodiment of the present invention.
Figure 3:
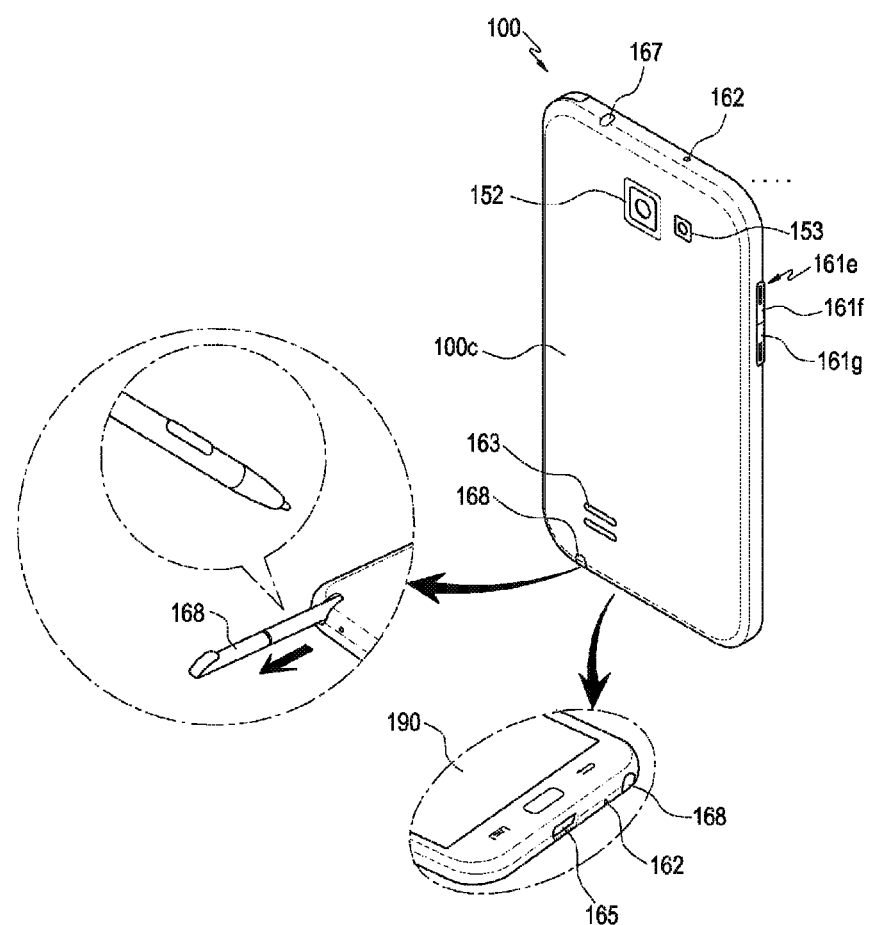
FIG. 3 is a diagram illustrating a rear perspective view of a mobile terminal, according to an embodiment of the present invention.

FIG. 2 is a diagram illustrating a front perspective view of a mobile terminal, according to an embodiment of the present invention. FIG. 3 is a diagram illustrating a rear perspective view of a mobile terminal, according to an embodiment of the present invention.

Referring to FIGS. 2 and 3, the touch screen 190 is disposed in the center of a front 100a of the mobile terminal 100. The touch screen 190 is formed large enough to occupy most of the front 100a of the mobile terminal 100. FIG. 2 illustrates an example of a main home screen displayed on the touch screen 190. The main home screen may be the first screen that is displayed on the touch screen 190 when the mobile terminal 190 is powered on. If the mobile terminal 100 has different home screens of several pages, the main home screen may be the first home screen among the home screens of several pages. On the main home screen is displayed shortcut icons 191-1, 191-2 and 191-3 provided for executing the frequently used applications, a main menu switch key (or Apps shortcut icon) 191-4, the current time, the weather, and the like. The main menu switch key 191-4 is provided to display menu screens on the touch screen 190. On the top of the touch screen 190 is displayed a status bar 192 indicating the status of the mobile terminal 100, such as, for example, a battery level, a received signal strength, and the current time.

Under the touch screen 190 is formed a home button 161a, a menu button 161b, and a back button 161c.

The home button 161a may be used to display the main home screen on the touch screen 190. For example, if the home button 161a is touched while any home screen different from the main home screen, or a menu screen is displayed on the touch screen 190, then the main home screen may be displayed on the touch screen 190. If the home button 161a is touched while applications are executed on the touch screen 190, the main home screen shown in FIG. 2 may be displayed on the touch screen 190. The home button 161a may also be used to display recently used applications, or a task manager on the touch screen 190.

The menu button 161b may be used to provide connection menus that can be used on the touch screen 190. The connection menus may include an add widget menu, a select wallpaper menu, a search menu, an edit menu, a preferences menu, and the like.

The back button 161c may be used to display the previous screen preceding the currently screen, or to exit the most recently used application.

On the edge of the front 100a of the mobile terminal 100 are disposed the first camera 151, an ambient light sensor 170a, and a proximity sensor 170b. On the rear 100c of the mobile terminal 100 are disposed the second camera 152, the flash 153, and the speaker 163.

On the sides 100b of the mobile terminal 100 are disposed, for example, a power/reset button 161d, volume button 161e (with volume up 161f and volume down 161g), a terrestrial DMB antenna 141a for broadcast reception, one or more microphones 162, and the like. The DMB antenna 141a may be detachably fixed to (or formed in) the mobile terminal 100.

The connector 165 is formed on the bottom of the mobile terminal 100. A plurality of electrodes may be formed in the connector 165, and connected to external devices by wires. The earphone jack 167 is formed on the top of the mobile terminal 100. An earphone may be inserted into the earphone jack 167.

The input unit 168 is mounted in the bottom of the mobile terminal 100. The input unit 168 may be kept inside the mobile terminal 100 after being inserted therein, and may be pulled out or detached from the mobile terminal 100 during its use.

Figure 4:
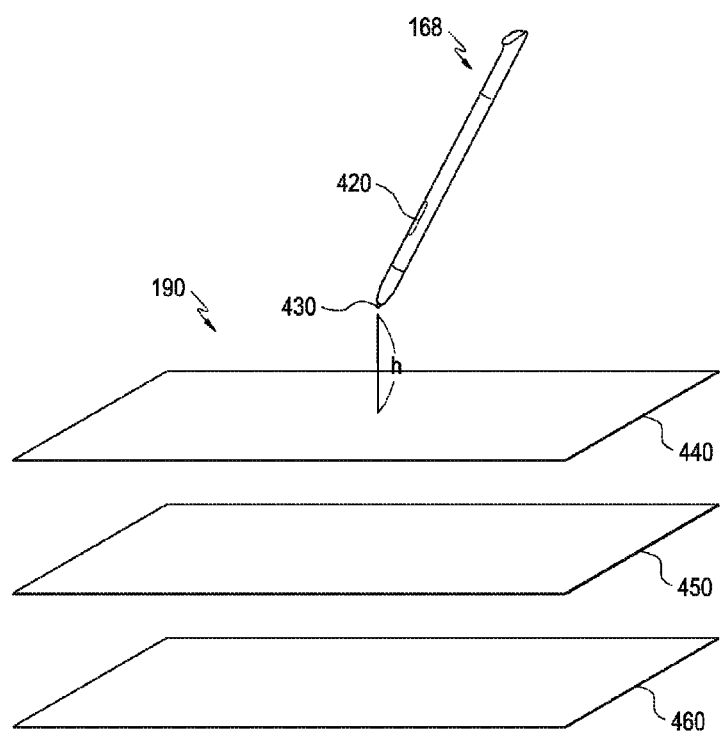
FIG. 4 is a diagram illustrating an internal cross-section of an input unit and a touch screen, which provide haptic effects, according to an embodiment of the present invention.

FIG. 4 is a diagram illustrating an internal cross-section of an input unit and a touch screen, which provide haptic effects, according to an embodiment of the present invention.

Referring to FIG. 4, the touch screen 190 includes a first touch panel 440, a display panel 450, and a second touch panel 460. The display panel 450 may be an LCD panel, an Active Mode OLED (AMOLED) panel, and the like, and may display a variety of images and a plurality of objects, which are associated with various operating statuses of the mobile terminal 100, the execution of applications, and services provided.

The first touch panel 440, which is a capacitive touch panel, may be a dielectric-coated panel that is configured to enable a current to flow on its glass surface and to store charges thereon, by coating both sides of the glass with a thin metallic conductive material (e.g., an Indium Tin Oxide (ITO) film). If the surface of the first touch panel 440 is touched by the input unit 168 (e.g., a user's finger or a pen), a certain amount of charges may move to the touch position by the static electricity, and the first touch panel 440 may detect the touch position by recognizing a change in the current due to the movement of charges. The first touch panel 440 may detect any type of touch that may cause static electricity, regardless of whether the touch is made by the finger or the pen.

The second touch panel 460, which is an Electronic Magnetic Resonance (EMR) touch panel, may include an electromagnetic induction coil sensor having a grid structure in which a plurality of loop coils are arranged in a predetermined first direction and a second direction crossing the first direction, and an electronic signal processor for providing an Alternating Current (AC) signal having a predetermined frequency to each of the loop coils in the electromagnetic induction coil sensor in sequence. If the input unit 168 with a resonance circuit built therein exists in the vicinity of a loop coil of the second touch panel 460, a magnetic field originating from the loop coil may cause a current that is based on mutual electromagnetic induction, in the resonance circuit of the input unit 168. Based on the current, an induced magnetic field may occur from a coil constituting the resonance circuit in the input unit 168, and the second touch panel 460 may detect the induced magnetic field from its loop coils which are in a signal receiving state, enabling the mobile terminal 100 to detect a hovering position and a touch position of the input unit 168, and a height 'h' from the first touch panel 440 to a pen tip 430 of the input unit 168. It will be apparent to those of ordinary skill in the art that the height 'h' from the first touch panel 440 of the touch screen 190 to the pen tip 430 is subject to change in response to the performance or structure of the mobile terminal 100. The second touch panel 460 may detect hovering and touch made by the input unit 168 capable of generating a current that is based on electromagnetic induction. The second touch panel 460 may be used as a dedicated touch panel for detecting hovering or touch by the input unit 168. The input unit 168 may also be referred to as an electromagnetic pen or an EMR pen. The input unit 168 may be different from the common pen without the resonance circuit that is detected by the first touch panel 440. The input unit 168 may include a button 420 used to change a value of electromagnetic induction caused by a coil arranged inside a penholder, the coil existing in an area adjacent to the pen tip 430. The input unit 168 is described in greater detail below with reference to FIG. 5.

The touch screen controller 195 may include a first touch panel controller and a second touch panel controller. The first touch panel controller may convert an analog signal received from the first touch panel 440 by detecting a finger touch or a pen touch, into a digital signal (e.g., X, Y, and Z coordinates), and provide the digital signal to the controller 110. The second touch panel controller may convert an analog signal received from the second touch panel 460 by detecting hovering or touch by the input unit 168, into a digital signal, and provide the digital signal to the controller 110. The controller 110 may control the display panel 450, the first touch panel 440, and the second touch panel 460 using the digital signal received from each of the first and second touch panel controllers. For example, the controller 110 may display a predetermined screen on the display panel 450 in response to hovering or touch by the finger, the pen or the input unit 168.

Accordingly, in the mobile terminal 100, according to an embodiment of the present invention, the first touch panel 440 may detect a touch by the user's finger or the pen, and the second touch panel 460 may detect hovering or touch by the input unit 168. Therefore, the controller 110 of the mobile terminal 100 may separately detect a touch by the user's finger or the pen, and hovering or touch by the input unit 168. Although one touch screen is illustrated in FIG. 4, the embodiments of present invention are not limited to one touch screen, and the mobile terminal 100 may include a plurality of touch screens. The multiple touch screens may be mounted on separate housings and connected to each other by a hinge, or may be mounted on a single housing. Each of the multiple touch screens may include a display panel and at least one touch panel as illustrated in FIG. 4.

Figure 5:
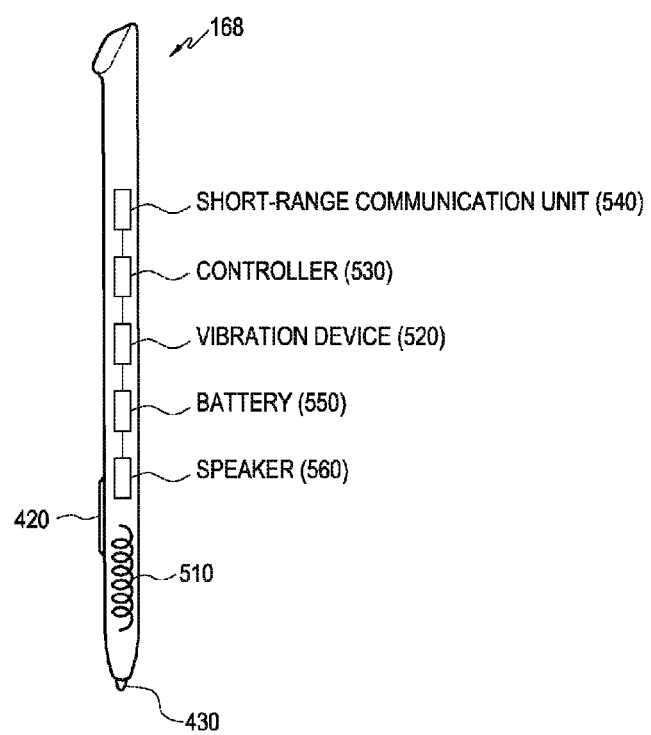
FIG. 5 is a block diagram illustrating an input unit providing hovering input effects, according to an embodiment of the present invention.

FIG. 5 is a block diagram illustrating an input unit providing hovering input effects, according to an embodiment of the present invention.

Referring to FIG. 5, the input unit (e.g., a touch pen) 168, according to an embodiment of the present invention, includes a penholder, the pen tip 430 disposed on an end of the penholder, the button 420 used to change a value of electromagnetic induction caused by the coil 510 arranged inside the penholder, the coil 510 existing in an area adjacent to the pen tip 430, the vibration device 520 that vibrates during occurrence of hovering input effects, a haptic controller 530 for analyzing a control signal that is received from the mobile terminal 100 due to hovering of the input unit 180 on or over the mobile terminal 100, and controlling a vibration intensity and a vibration cycle of the vibration device 520 to provide haptic effects to the input unit 168, a short-range communication unit 540 for performing short-range communication with the mobile terminal 100, and a battery 550 for supplying power for vibration of the input unit 168. In addition, the input unit 168 includes the speaker 560 for outputting sounds corresponding to the vibration cycle and/or the vibration intensity of the input unit 168. The speaker 560 may output the sounds corresponding to the haptic effects provided to the input unit 168, together with the speaker 163 mounted in the mobile terminal 100, at the same time, or before/after a lapse of a predetermined time (e.g., 10 ms).

The input unit 168 having this stricture may be configured to support electromagnetic induction. If a magnetic field is formed in a certain point of the touch screen 190 by the coil 510, the touch screen 190 may recognize a touch point by detecting the position of the magnetic field.

More specifically, the speaker 560, under control of the haptic controller 530, may output sounds corresponding to various signals (e.g., wireless signals, broadcast signals, digital audio files, digital video files and the like) provided from the mobile communication module 120, the sub-communication module 130 or the multimedia module 140 mounted in the mobile terminal 100. In addition, the speaker 560 may output the sounds (e.g., button manipulation tones or ring back tones for calls) corresponding to the functions executed by the mobile terminal 100. One or more speakers 560 may be formed in a proper position or positions of the housing of the input unit 168.

If the pen tip 430 is in contact with, or is put on or over the touch screen 190 in a position where hovering can be detected (with a height or a distance of, for example, 5 mm), the haptic controller 530 may analyze at least one control signal received from the mobile terminal 100 via the short-range communication unit 540, and control the vibration cycle and the vibration intensity of the vibration device 520 mounted in the input unit 168, depending on the analyzed control signal. The control signal, which is a signal transmitted by the mobile terminal 100, may be periodically transmitted to the input unit 168 for a predetermined time, or until the hovering ends. The control signal may include a pattern of haptic feedback corresponding to the feeling (e.g., vibrating feeling, rippling feeling and the like) that the user feels. The haptic feedback may be the same or different depending on whether objects are scrolled, whether any one of scrolled multiple objects is selected, whether the selected object is zoomed in or zoomed out, or whether objects are scrolled up or down.

The control signal may be transmitted to the input unit 168 by at least one of the mobile communication module 120 and the sub-communication module 130 in the mobile terminal 100. The control signal may include at least one of information for activating vibration mode of the vibration device 520 in the input unit 168, information indicating the vibration intensity of the input unit 168, information for deactivating vibration mode of the vibration device 520 in the input unit 168, and information indicating the total time for providing the haptic effects. The control signal may have a size or a length of about 8 bits, and may be repeatedly transmitted at intervals of a predetermined time (e.g., 5 ms), to control vibrations of the input unit 168, so the user may recognize that the vibrations corresponding to the haptic effects are repeatedly generated at regular intervals. For example, the control signal may include information as defined in Table 1 below.

TABLE 1

| Field | Vibration Device Activation | Vibration Intensity | Vibration Device Deactivation |
|---|---|---|---|
| Information | 1 | 125 125 131 131 0 | 2 |

As illustrated in Table 1, the control signal may include information for activating the vibration device 520 in the input unit 168, information indicating the vibration intensity of the vibration device 520, and information for deactivating the vibration device 520. Although the control signal may be transmitted to the input unit 168 at intervals of 5 ms, it is a mere example and the transmission of the control signal may be variable depending on the cycle of the haptic pattern. The transmission cycle and the transmission period of the control signal are also variable. The transmission period may correspond to a period for which recognition of hovering lasts.

Figure 6:
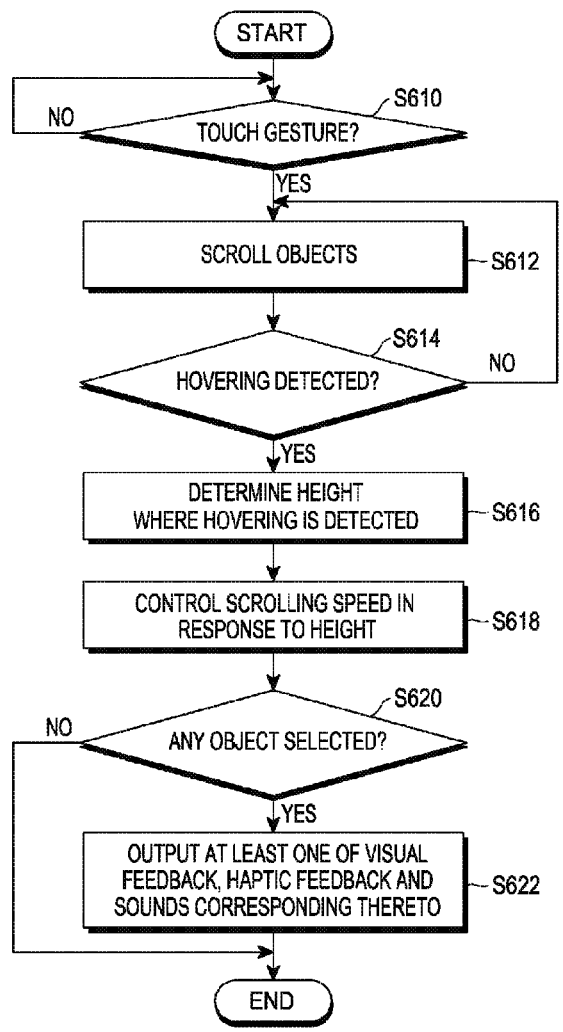
FIG. 6 is a flowchart illustrating a method for controlling a scrolling speed and providing haptic effects for a selected object, according to an embodiment of the present invention.

FIG. 6 is a flowchart illustrating a method for controlling a scrolling speed and providing haptic effects for a selected object, according to an embodiment of the present invention. FIGS. 7A to 7E illustrate the controlling of a scrolling speed and providing haptic effects for a selected object, according to an embodiment of the present invention.

In step S610 of FIG. 6, it is determined whether a gesture is input. If a gesture to display at least one object above is input using a finger 710, while the mobile terminal 100 displays a plurality of objects (e.g., 720a to 720h in FIG. 7A) or an object on the touch screen 190, the mobile terminal 100 may scroll the plurality of objects in response to the gesture, and display the objects (e.g., 740a to 740h in FIG. 7B) being scrolled, on the touch screen 190, in step S612. In an embodiment of the present invention, the gesture may be input not only by the finger but also by the input unit 168. In the following description, the finger is assumed to be used to make a gesture, for convenience of description. The touch gesture may include at least one of a gesture to display at least one object above at least one object displayed on a touch screen by moving (or flicking) a finger down, a gesture to display at least one object existing beneath at least one object displayed on a touch screen by moving a finger up, a gesture to display at least one object existing in the left side of at least one object displayed on a touch screen by moving a finger from the left to the right, and a gesture to display at least one object existing in the right side of at least one object displayed on a touch screen by moving a finger from the right to the left. In addition to these touch gestures to scroll objects up, down, left or right, a touch gesture to scroll objects diagonally may be applied in embodiments of the present invention. In this case, if a touch gesture to scroll objects diagonally is input, the controller 110 may analyze a progress direction of the touch gesture, and display at least one object existing in the opposite side of the progress direction of the gesture. In this way, displaying objects by means of the touch gesture to scroll objects diagonally may be achieved using the same algorithm as that of displaying objects by the touch gestures to scroll objects up, down, left or right. Displaying objects by these touch gestures may be controlled in response to the speed of the input touch gestures. Specifically, if the speed of a touch gesture is fast, the display speed of objects being scrolled may increase, and if the speed of a touch gesture is slow, the display speed of objects being scrolled may decrease. Thereafter, the display speed of objects may gradually decrease, and finally, the display may be stopped. The display speed may decrease, as the hovering distance between the touch screen 190 and the finger is shorter.

For example, a relationship between the speed of a touch gesture and the display speed of objects may be defined as shown in Table 2 below.

TABLE 2

| Gesture Speed (Gesture Distance/Time) | Number of Displayed Objects (Number/Second) |
|---|---|
| 10 cm/s or more | 30/s or more |
| 4 cm/s~10 cm/s | 10/s~30/s |
| 4 cm/s or below | 10/s or below |

In addition, a relationship between the hovering distance between touch screen 190 and the finger, and the display speed of objects may be defined as shown in Table 3 below.

TABLE 3

| Hovering Distance | Number of displayed objects (number/second) |
|---|---|
| 5 mm or more | 20/s or more |
| 2 mm~5 mm | 5/s~20/s |
| 2 mm or below | 5/s or below |

As illustrated in Table 2 and Table 3, in response to the speed of a touch gesture, the number of displayed objects may increase, as the speed increases. In addition, the number of displayed objects may decrease, as the hovering distance between the touch screen 190 and the finger is shorter. Table 2 and Table 3 are mere examples, and the present disclosure may not be limited thereto.

Referring back to FIG. 6, in step S614, it is determined whether hovering is detected. If hovering is not detected the objects continue to scroll in step S612. Upon detecting hovering by a finger (with a hovering distance being, for example, 5 mm or below) while the objects are displayed by the touch gesture, the mobile terminal 100 determines the height at which the hovering is detected, in step S616. The mobile terminal 100 controls a scrolling speed in response to the detected height, in step S618. If the touch gesture is input, a plurality of objects may be displayed in the opposite direction to the progress direction of the input touch gesture. In this state, the user may decrease the scrolling speed or stop the scrolling by performing hovering or making a touch using a finger 730 in FIG. 7C. Making a touch may stop the scrolling, and performing hovering may decrease the scrolling speed depending on the gap between the finger 730 and the touch screen 190. Upon detecting hovering for a predetermined time (e.g., 1 second) or more, the mobile terminal 100 may calculate the gap ('h' in FIG. 7D) between the touch screen 190 and a finger 760. The calculated gap is for controlling the scrolling speed. As the gap is smaller, the scrolling speed may sharply decrease. On the contrary, as the gap is larger, the scrolling speed may gradually increase. As such, the scrolling speed may be different depending on the distance 'h' between the touch screen 190 and the finger. For example, as illustrated in Table 3, if the hovering distance between the touch screen 190 and the finger is 5 mm or more, 20 or more objects may be displayed per second. If the hovering distance is 2 mm to 5 mm, 5 to 20 objects may be displayed per second. If the hovering distance is 2 mm or below, 5 or less objects may be displayed per second. The number of displayed objects in Table 3 may be less than that when no hovering occurs.

Referring again to FIG. 6, in step S620, it is determined whether any object is selected. If an object is not selected the methodology terminates. If an object is selected while the mobile terminal 100 displays objects in response to the controlled scrolling speed, the mobile terminal 100 may provide at least one of visual feedback for the selected object, haptic feedback for the selected object, and a sound corresponding thereto, in step S622. Specifically, while displaying objects 750 and 751 in FIG. 7C, the mobile terminal 100 may provide a visual feedback to the selected object in response to an input to select the object 751, and provide a predetermined haptic feedback to the selected object in response to an input to select the object. The predetermined haptic feedback is for controlling vibration of the mobile terminal 100, and if an object is selected, the mobile terminal 100 may vibrate in a predetermined haptic feedback of waving (or rippling) effects, and output the sound corresponding thereto. The visual feedback is an effect for visually showing the user the selected object, and may include at least one of vibration effects and rippling effects for the selected object. In addition, the visual feedback may include at least one of vibration effects and rippling effects spreading omni-directionally from the selected object to all the objects displayed, as shown by reference numeral 752 in FIG. 7C. More specifically, as for the visual effects, at least one of vibration effects and rippling effects may be high in strength at the point touched by the finger, and at least one of vibration effects and rippling effects may be gradually lower in strength as the points get away from the touch point. It will be apparent to those of ordinary skill in the art that the present disclosure may provide not only the vibration effects and rippling effects, but also various other types of feedback allowing the user to perceive movement of objects. Furthermore, if there is a first or last object, the visual feedback may include effects of transforming one side of the last object to be concave or convex. The predetermined haptic feedback may have the vibration cycle and the vibration time shown in FIG. 7E, as a pattern for controlling vibrations of the mobile terminal 100.

Figure 7A:
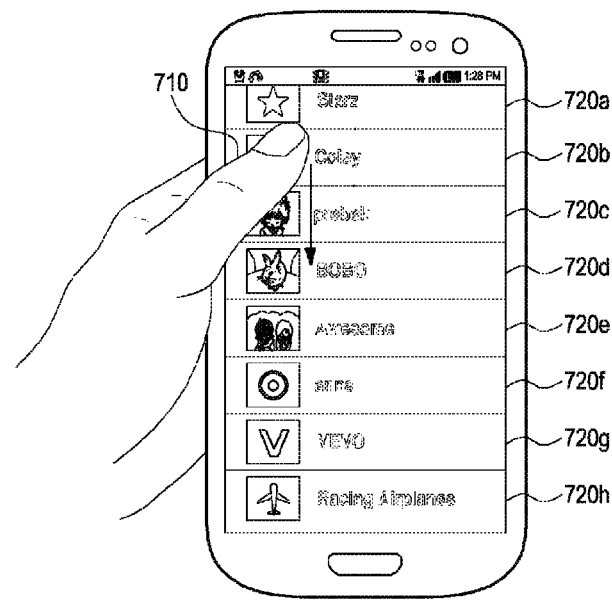
FIG. 7A illustrates a screen on which a plurality of objects displayed on a touch screen of a mobile terminal are scrolled, according to an embodiment of the present invention.
Figure 7B:
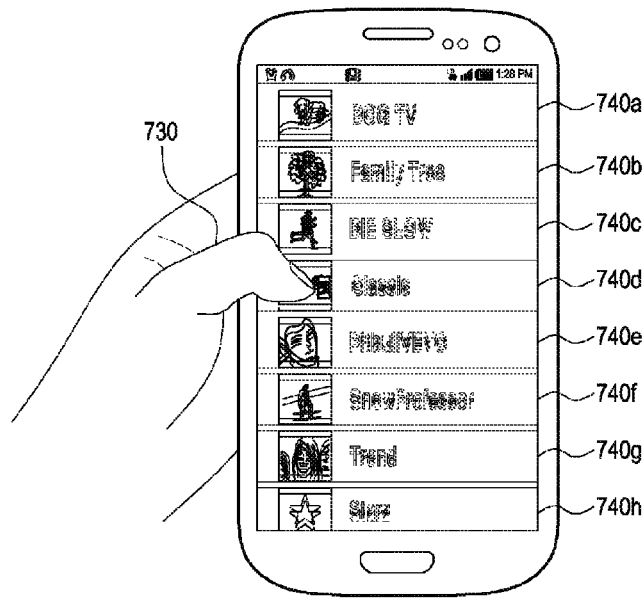
FIG. 7B illustrates a screen on which a plurality of objects displayed on a touch screen are being scrolled, according to an embodiment of the present invention.
Figure 7C:
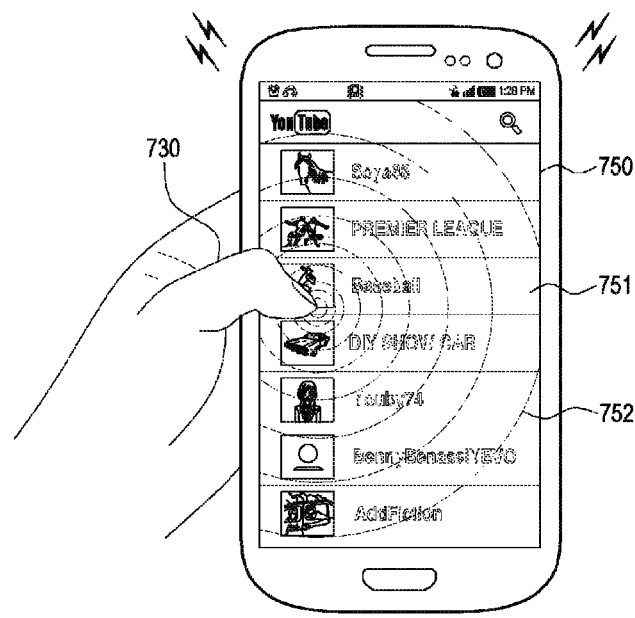
FIG. 7C illustrates the controlling of a scrolling speed is controlled for a plurality of objects being scrolled by making a hovering input, and providing haptic effects for a selected object, according to an embodiment of the present invention.
Figure 7D:
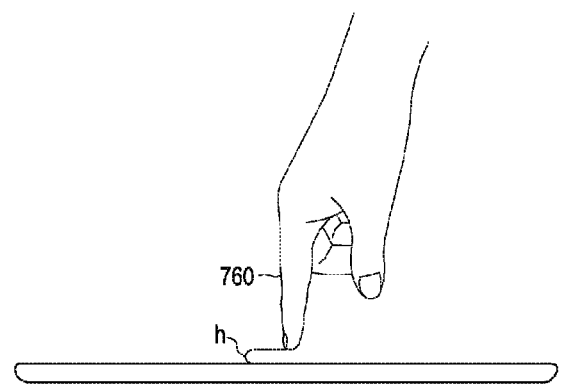
FIG. 7D illustrates the controlling of a scrolling speed for objects being scrolled by making a hovering input, according to another embodiment of the present invention.
Figure 7E:
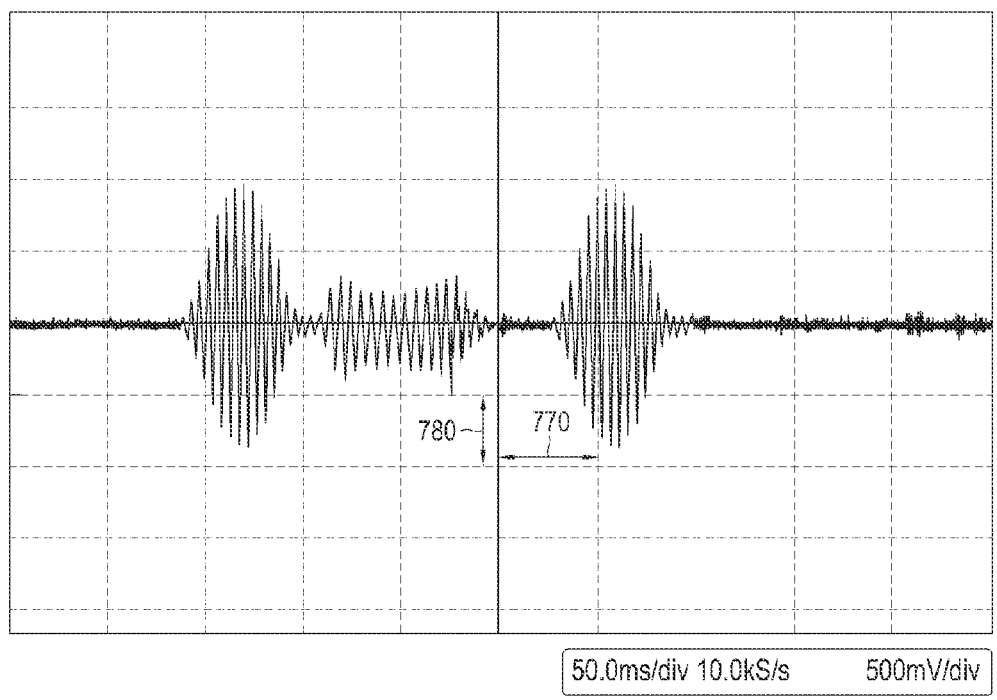
FIG. 7E illustrates a waveform of a haptic pattern used when an object is selected, according to an embodiment of the present invention.

Referring to FIG. 7E, the waveform of a haptic pattern used when an object is selected, according to an embodiment (described in FIG. 6) of the present invention, may provide a haptic effect to the mobile terminal 100 with vibrations corresponding to a voltage of 2V for 50 ms, provide vibrations corresponding to a voltage of about 30 mV, and then, provide again the haptic effect with the first provided vibrations (i.e., vibrations corresponding to a voltage of 2V), thereby allowing the user to feel the vibrations corresponding to the feeling of hovering or touching an object. FIG. 7E illustrates a waveform for a haptic pattern providing the feeling of waving or rippling when an object is selected on the touch screen 190 on which objects are displayed. In FIG. 7E, the horizontal axis (i.e., X-axis) is a time axis representing the vibration time, and its unit 770 is 50 ms. The vertical axis (i.e., Y-axis) represents the vibration intensity, and its unit 780 is 500 mV. The waveform of a haptic pattern used when an object is selected, according to an embodiment of the present disclosure, is not limited to FIG. 7E. In addition to the waveform of FIG. 7E, other various waveforms having different vibration cycles and intensities may be stored in the mobile terminal 100, and other haptic patterns may be generated and stored by combining pre-stored waveforms.

Figure 8:
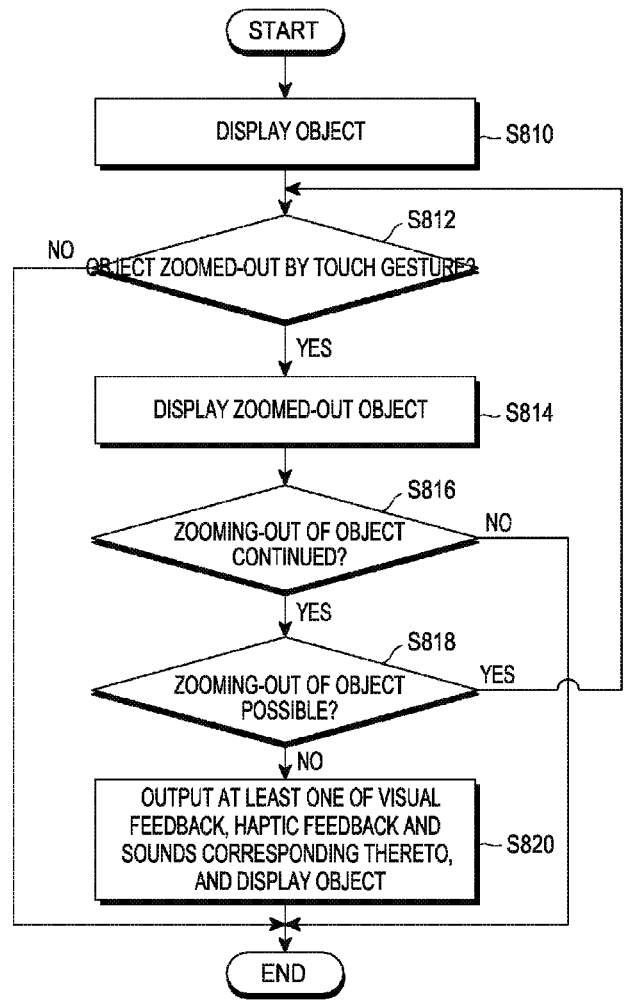
FIG. 8 is a flowchart illustrating a method for providing visual feedback and haptic feedback when a pinch is applied to an object displayed on a touch screen, according to an embodiment of the present invention.

FIG. 8 is a flowchart illustrating a method for providing visual feedback and haptic feedback when a pinch is applied to an object displayed on a touch screen, according to an embodiment of the present invention. FIGS. 9A to 9D illustrate a process of pinching an object displayed on a touch screen, according to an embodiment of the present disclosure.

Figure 9A:
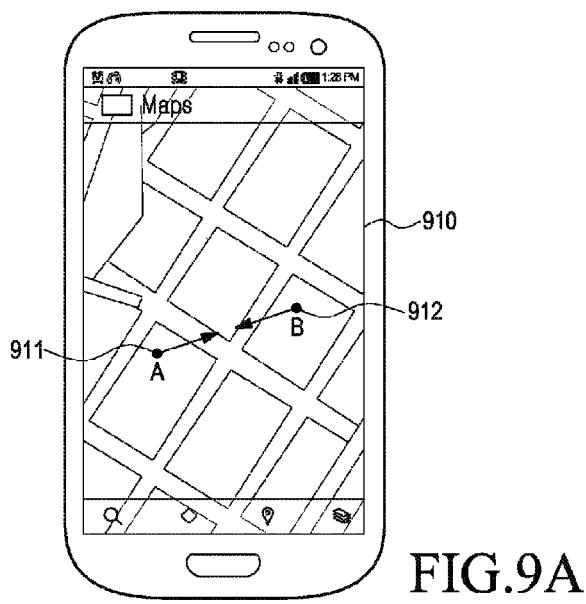
FIG. 9A illustrates the pinching of an object displayed on a touch screen of a mobile terminal, according to an embodiment of the present invention.

The mobile terminal 100 displays an object on the touch screen 190, in step S810. The object may include not only images, such as photos, maps, documents and Emails, but also any objects that can be zoomed out or in on the touch screen 190. Although a map will be assumed as an object for convenience of description, it will be apparent to those of ordinary skill in the art that the present disclosure is not limited to the map, but may be applied to any object that can be zoomed out or in on the touch screen 190. FIG. 9A illustrates a map 910 displayed on the touch screen 190. On the map 910 may be shown a first point A 911, and a second point B 912 that is spaced apart from the first point A 911. The first point A 911 and the second point B 912 may be pinched (or moved) to the right and the left, respectively.

In step S812, it is determined whether an object is zoomed-out by a touch gesture. If an object is not zoomed-out by a touch gesture, the methodology terminates. If a touch gesture (e.g., a pinch gesture) is input to the map 910 displayed on the touch screen 190, the mobile terminal 100 zooms out the map 910 displayed on the touch screen 190 in response to the input pinch, in step S814. The pinch refers to a gesture to drag two fingers simultaneously or sequentially so that two points on the touch screen 190 get closer to each other. The pinch may be input by touching two points on the touch screen 190, and then, dragging the two points, or may be input by hovering with the touch screen 190. As illustrated in FIG. 9A, if the user moves the first point A 911 to the right and the second point B 912 to the left, the mobile terminal 100 may zoom out the displayed map and display the zoomed-out map on the touch screen 190. The controller 110 may calculate a distance between the points touched by fingers to make a pinch and a distance between the touch points after the pinch, and compare the calculated distances with each other, and may determine that a pinch (gesture) was made, if the distance between the touch points after the pinch is shorter than the distance between the touch points before the pinch.

In step S816, it is determined whether the zooming-out of the object is continued. If the zooming-out is not continued, the methodology terminates. If the pinch to zoom out the map is continuously input, the mobile terminal 100 it is determined whether further zooming-out of the object is possible, in step S818. If further zooming-out is possible, the methodology returns to step S812 where the touch gesture is determined and the zoomed-out object is displayed in S814.

Figure 9B:
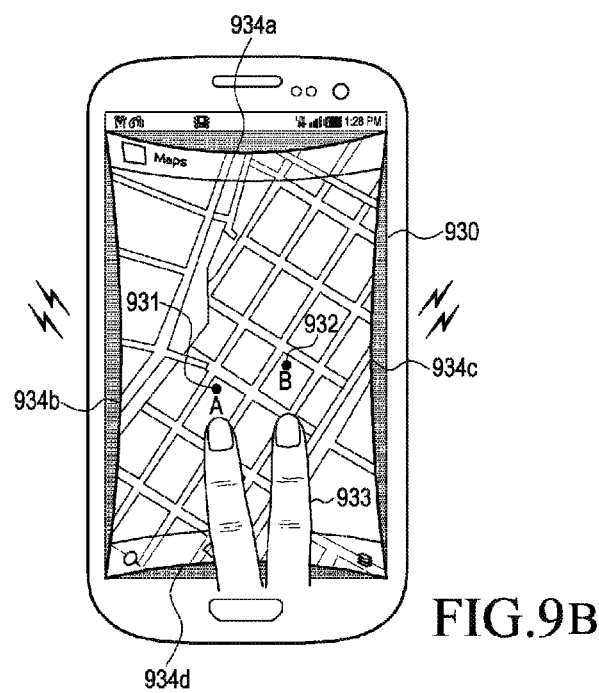
FIG. 9B illustrates the displaying of an object on a touch screen that can no longer be pinched, according to an embodiment of the present invention.

If the map can no longer be zoomed out by a pinch command, the mobile terminal 100 may provide at least one of visual feedback, haptic feedback, and a sound corresponding thereto, to the map that can no longer be zoomed out, and display the resulting map on the touch screen 190, in step S820. The controller 110 may determine that the map can no longer be zoomed out, depending on the object characteristics of the map provider. For example, the map may be commonly zoomed in or out, and the user may determine that the map can no longer be zoomed out with the map zoom ratio, or may determine that the map can no longer be zoomed out by the function provided by the mobile terminal 100. If the map can no longer be zoomed out, the controller 110 may provide visual feedback such as bounce effects to the map. The visual feedback, feedback for visually showing the user the selected map, may be feedback for indicating that the selected map can no longer be zoomed out. For example, as illustrated in FIG. 9B, an upper side 934a, a lower side 934d, and both sides 934b and 934c of a map 930 displayed on the touch screen 190 may be transformed to be concave. Due to the pinch, two points 931 and 932 on the map 930 may be nearest to each other. The mobile terminal 100 may transform four sides of one map to be concave, or transform at least one side of the map to be concave, to provide a visual feedback. Alternatively, as illustrated in FIG. 9D, if the user pinches two points on a map 950 displayed on the touch screen 190, a side corresponding to a point whose drag distance is longer may be transformed to be more concave than the other side. Specifically, in FIG. 9D, if a point A is dragged from a first point 951 to a second point 952 on the touch screen 190 and a point B is dragged from a third point 953 to a fourth point 954, and if a drag distance d1 of the point A is longer than a drag distance d2 of the point B, then the left side of the point A may be transformed to be more concave than the right side of the point B. On the contrary, if the distance d1 of the point A is not longer than the drag distance d2 of the point B, the right side of the point B may be transformed to be more concave than the left side of the point A. The positions of four vertices located at the corners of the object may be fixed unchanged. Similarly, not only the left and right sides, but also the upper and lower sides may be transformed to be differently concave, using the difference between a drag distance of an upper point and a drag distance of a lower point.

If the selected map can no longer be zoomed out, the mobile terminal 100 may control vibrations in response to a predetermined haptic feedback, and output the sound corresponding thereto. If the input of the pinch ends (e.g., if the touch for a pinch is released from the touch screen 190), the mobile terminal 100 may provide a rippling visual feedback to the selected object. The predetermined haptic feedback may be different depending on the up/down/left/right movement of the object, or the zooming-in/out of the map.

Figure 9C:
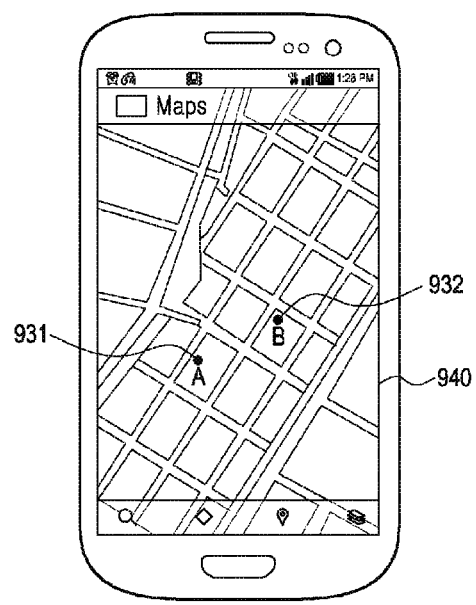
FIG. 9C illustrates the results obtained by pinching an object displayed on a touch screen, according to an embodiment of the present invention.
Figure 9D:
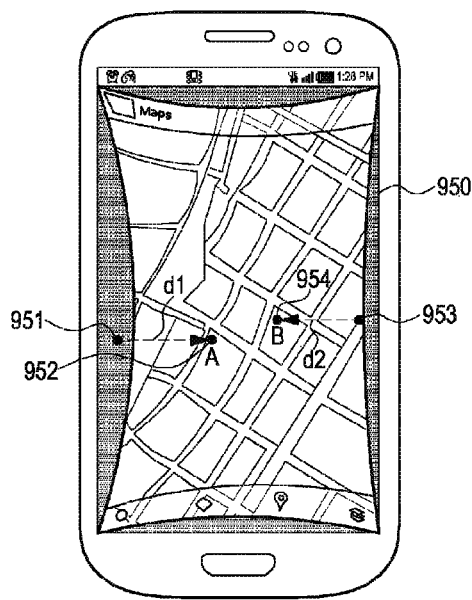
FIG. 9D illustrates the displaying of an object on a touch screen that can no longer be pinched, according to another embodiment of the present invention.
Figure 12:
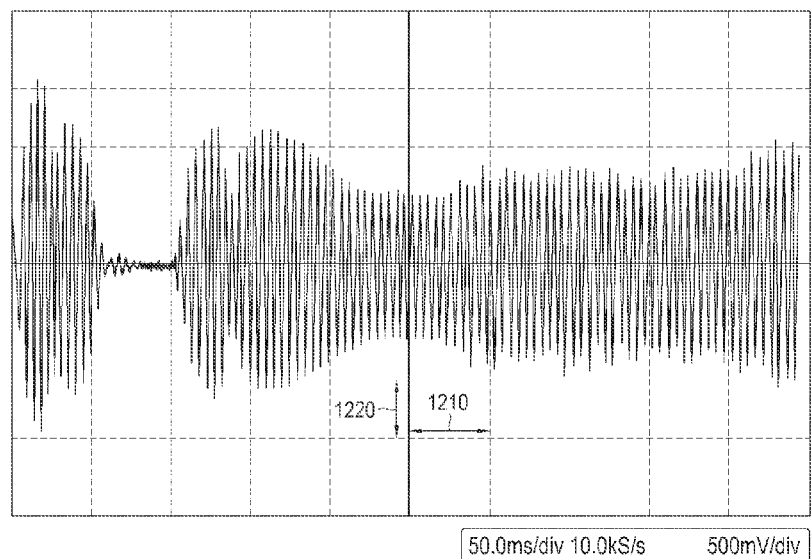
FIG. 12 illustrates a waveform of a haptic pattern used when an object displayed on a touch screen can no longer be pinched or spread, according to an embodiment of the present invention.

The distance between the two points 931 and 932 on a map 940 illustrated in FIG. 9C may be the same as the distance between the two points 931 and 932 in FIG. 9B. The map 940 illustrated in FIG. 9C may be its zoomed-out minimum map to which the pinch function can no longer be applied, and if the user desires to zoom in the map, the user may zoom in the map using the spread function. If the two points 931 and 932 on the map 930 can no longer undergo a pinch operation after getting closest to each other by the pinch as illustrated in FIG. 9B, the mobile terminal 100 may output a predetermined haptic pattern whose waveform is as shown in FIG. 12.

Figure 10:
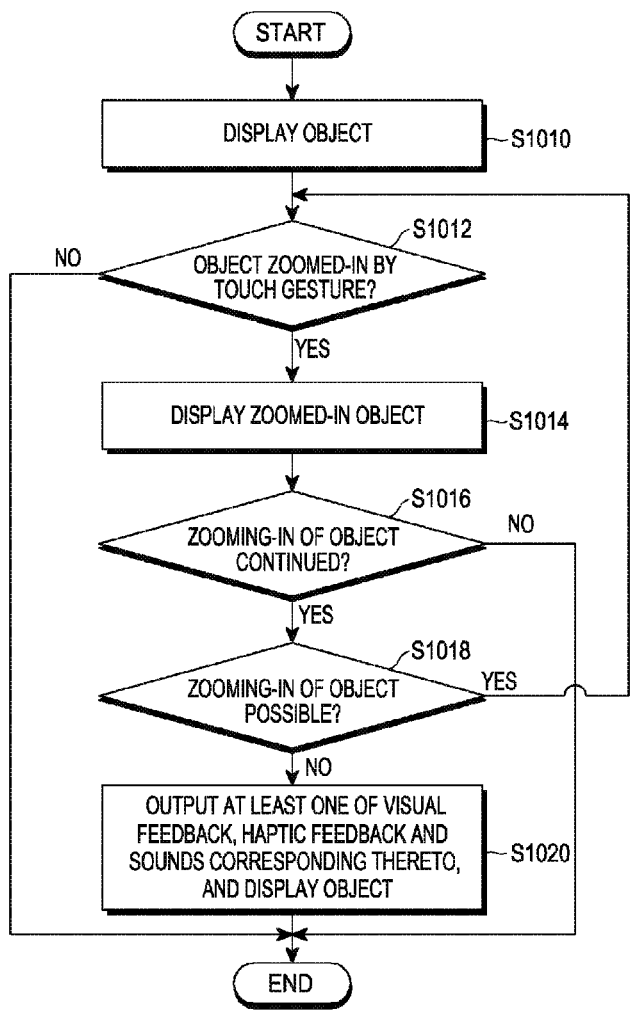
FIG. 10 is a flowchart illustrating a method for providing visual feedback and haptic feedback when a spread is applied to an object displayed on a touch screen, according to an embodiment of the present invention.

FIG. 10 is a flowchart illustrating a method for providing visual feedback and haptic feedback when a spread is applied to an object displayed on a touch screen, according to an embodiment of the present invention. FIGS. 11A to 11D illustrate a process of spreading an object displayed on a touch screen, according to an embodiment of the present invention.

Figure 11A:
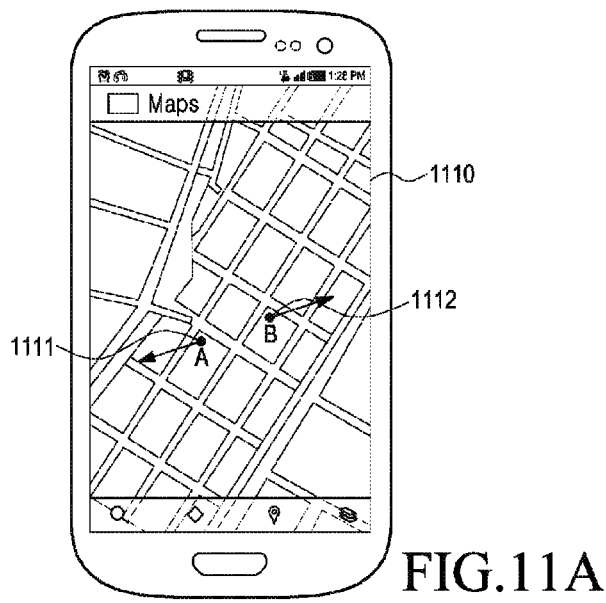
FIG. 11A illustrates the spreading of an object displayed on a touch screen of a mobile terminal, according to an embodiment of the present invention.

The mobile terminal 100 displays an object on the touch screen 190, in step S1010. The object may include not only images, such as photos, maps, documents and Emails, but also any type of object that can be zoomed in or out on the touch screen 190. FIG. 11A illustrates a map 1110 displayed on the touch screen 190. On the map 1110 may be shown a first point A 1111, and a second point B 1112 that is spaced apart from the first point A 1111. The first point A 1111 and the second point B 1112 may be spread (or moved) to the left and the right, respectively.

In step S1012, it is determined whether an object is zoomed-in by a touch gesture. If an object is not zoomed-in by a touch gesture, the methodology terminates. If a spread to zoom in the map 1110 displayed on the touch screen 190 is input, the mobile terminal 100 may spread the displayed map 1110 and display the spread map on the touch screen 190 in response to the spread input, in step S1014. The spread refers to a gesture to drag two fingers simultaneously or sequentially so that two points on the touch screen 190 may be spaced farther away from each other. The spread may be input by touching two points on the touch screen 190, and then, dragging the two points, or may be input by hovering with the touch screen 190.

As illustrated in FIG. 11A, if the user moves the first point A 1111 to the left and the second point B 1112 to the right, the mobile terminal 100 may zoom in the displayed map and display the zoomed-in map on the touch screen 190. The controller 110 may calculate a distance between the points touched by fingers to make a spread and a distance between the touch points after the spread, and compare the calculated distances with each other, and may determine that a spread (gesture) was made, if the distance between the touch points after the spread is longer than the distance between the touch points before the spread.

In step S1016, it is determined whether zooming-in of the object is continued. If zooming-in of the object is not continued, the methodology terminates. If the spread to zoom in the map is continuously input, it is determined whether further zooming-in of the object is possible, in step S1018. If it is determined that further zooming-in of the object is possible, the methodology returns to step S1012 where the touch gesture is determined, and the further zoomed-in object is displayed in step S1014. The process of zooming in the map through a spread may be repeatedly performed until the map can no longer be zoomed in.

Figure 11B:
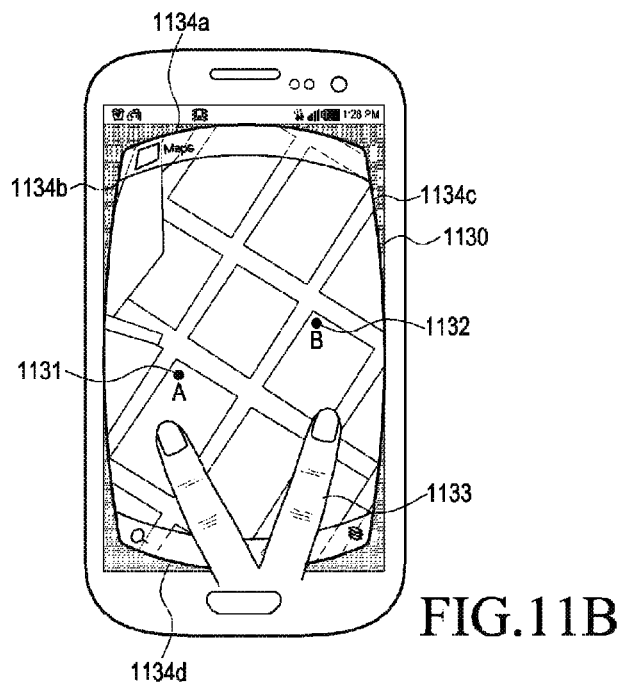
FIG. 11B illustrates the displaying of an object on a touch screen that can no longer be spread, according to an embodiment of the present invention.

If the map can no longer be zoomed in by a spread, the mobile terminal 100 may provide at least one of visual feedback, haptic feedback, and a sound corresponding thereto, to the map that can no longer be zoomed in, and display the resulting map on the touch screen 190, in step S1020. The controller 110 may determine that the map can no longer be zoomed in, depending on the object characteristics of the map provider. For example, the map may be commonly zoomed in or out, and the user may determine that the map can no longer be zoomed in with the map zoom ratio, or may determine that the map can no longer be zoomed in by the function provided by the mobile terminal 100. If the map can no longer be zoomed in, the controller 110 may provide a visual feedback such as bounce effects to the map. The visual feedback, feedback for visually showing the user the selected map, may be feedback for indicating that the selected map can no longer be zoomed in. For example, FIG. 11B illustrates an example in which an object displayed on a touch screen can no longer be spread, and in this example, an upper side 1134a, a lower side 1134d and both sides 1134b and 1134c of a map 1130 displayed on the touch screen 190 may be transformed to be convex by fingers 1133. Due to the spread, two points 1131 and 1132 on the map 1130 may be farthest from each other. The mobile terminal 100 may transform four sides of one map to be convex, or transform at least one side of the map to be convex, to provide a visual feedback.

Figure 11C:
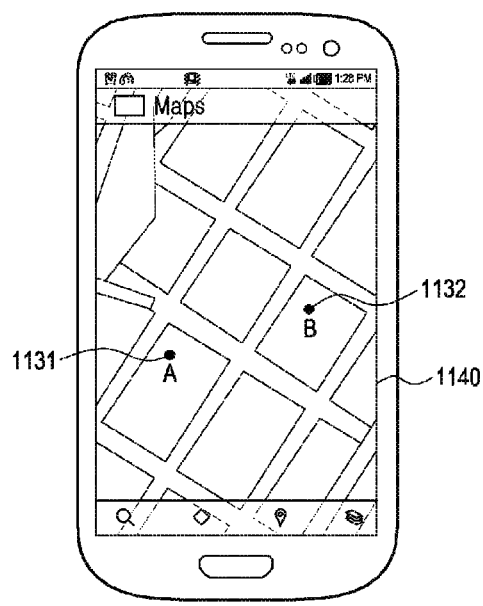
FIG. 11C illustrates the results obtained by spreading an object displayed on a touch screen, according to an embodiment of the present invention.
Figure 11D:
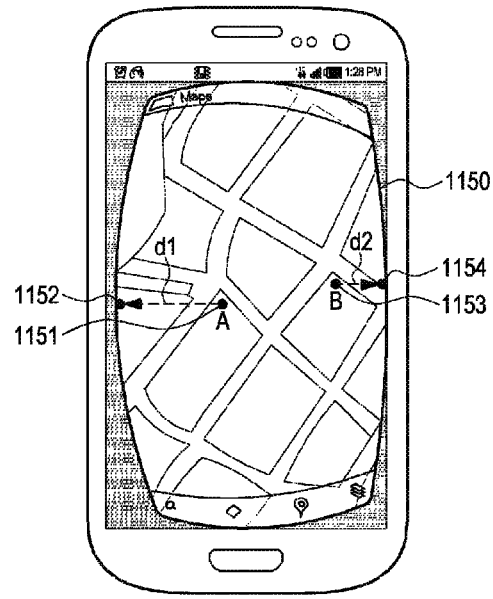
FIG. 11D illustrates the displaying of an object on a touch screen that can no longer be spread, according to another embodiment of the present invention.

Alternatively, as illustrated in FIG. 11D, if the user spreads two points on a map 1150 displayed on the touch screen 190, a side corresponding to a point whose drag distance is longer may be transformed to be more convex than the other side. Specifically, in FIG. 11D, if a point A is dragged from a first point 1151 to a second point 1152 on the touch screen 190 and a point B is dragged from a third point 1153 to a fourth point 1154, and if a drag distance d1 of the point A is longer than a drag distance d2 of the point B, then the left side of the point A may be transformed to be more convex than the right side of the point B. On the contrary, if the distance d1 of the point A is not longer than the drag distance d2 of the point B, the right side of the point B may be transformed to be more convex than the left side of the point A. Similarly, not only the left and right sides, but also the upper and lower sides may be transformed to be differently convex, using the difference between a drag distance of an upper point and a drag distance of a lower point. If the selected map can no longer be zoomed in, the mobile terminal 100 may control vibrations in response to a predetermined haptic feedback, and output the sound corresponding thereto.

The distance between the two points 1131 and 1132 on a map 1140 illustrated in FIG. 11C may be the same as the distance between the two points 1131 and 1132 in FIG. 11B. The map 1140 illustrated in FIG. 11C may be its zoomed-in maximum map to which the spread function can no longer be applied, and if the user desires to zoom out the map, the user may zoom out the map using the pinch function. If the two points 1131 and 1132 on the map 1130 can no longer undergo a spread operation after getting farthest from each other by the spread as illustrated in FIG. 11B, the mobile terminal 100 may output a predetermined haptic pattern whose waveform is as shown in FIG. 12.

The waveform of the predetermined haptic pattern illustrated in FIG. 12 may be used in common for the embodiment of FIGS. 8 and 9A to 9D, and the embodiment of FIGS. 10 and 11A to 11D.

FIG. 12 illustrates a waveform of a haptic pattern used when an object displayed on a touch screen can no longer be pinched or spread, according to an embodiment of the present invention. The waveform of the haptic pattern in FIG. 12 may provide vibrations corresponding to a voltage of about 3V for 50 ms, and then, provide no vibrations for 50 ms. Thereafter, the waveform may provide vibrations corresponding to a voltage of 2V for a long time, thereby allowing the user to feel the feeling that an object displayed on the touch screen 190 can no longer be spread or pinched. For example, the waveform in FIG. 12 may be a waveform for a tactile haptic pattern that provides a bouncing feeling when an object displayed on the touch screen 190 can no longer be spread or pinched. In FIG. 12, the horizontal axis (i.e., X-axis) is a time axis representing the vibration time, and its unit 1210 is 50 ms. The vertical axis (i.e., Y-axis) represents the vibration intensity, and its unit 1220 is 500 mV. The waveform of a haptic pattern used when an object displayed on a touch screen can no longer be pinched or spread, according to an embodiment of the present invention, is not limited to FIG. 12. In addition to the waveform of FIG. 12, other waveforms having different vibration cycles and intensities may be stored in the mobile terminal 100, and other haptic patterns may be generated and stored by combining pre-stored waveforms.

Figure 13:
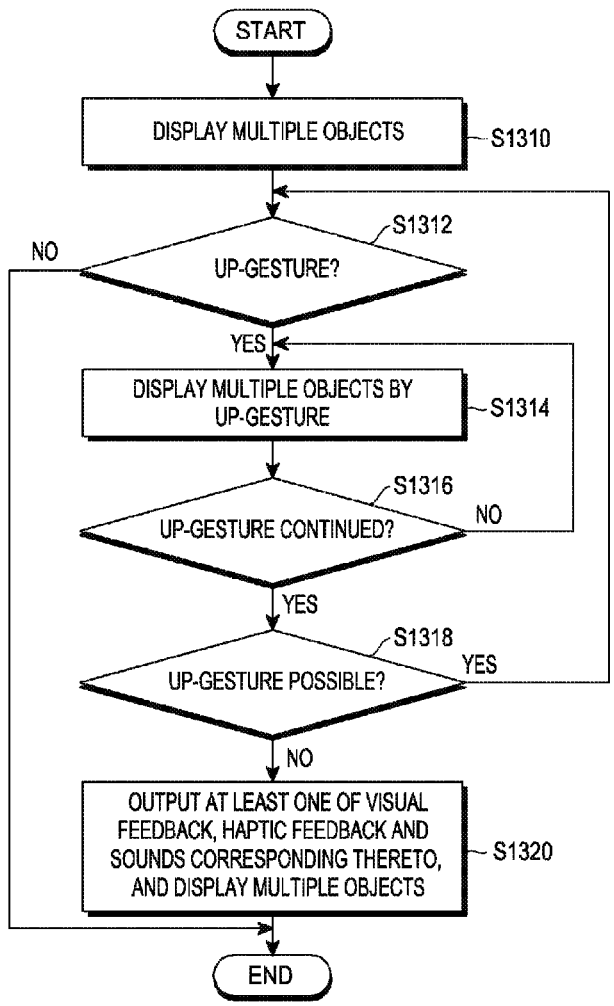
FIG. 13 is a flowchart illustrating a method for providing visual feedback and haptic feedback when a gesture is made to display at least one object existing beneath a plurality of objects displayed on a touch screen, according to an embodiment of the present invention.

FIG. 13 is a flowchart illustrating a method for providing visual feedback and haptic feedback when a gesture is made to display at least one object existing beneath a plurality of objects displayed on a touch screen, according to an embodiment of the present invention. FIGS. 14A to 14E illustrate a process of making a gesture to display at least one object existing beneath a plurality of objects displayed on a touch screen, according to an embodiment of the present invention.

Figure 14A:
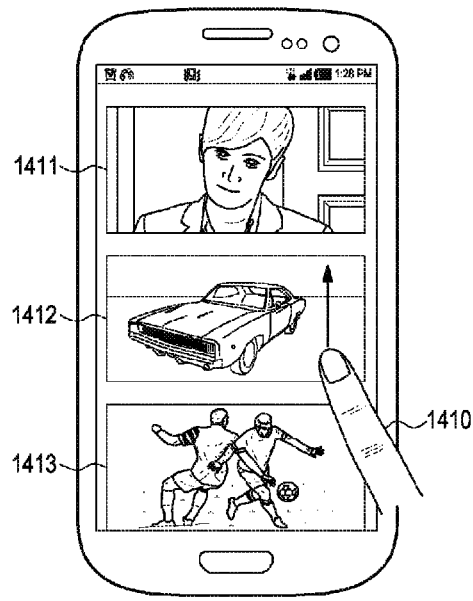
FIG. 14A illustrates the displaying of a plurality of objects on a touch screen of a mobile terminal, according to an embodiment of the present invention.
Figure 14B:
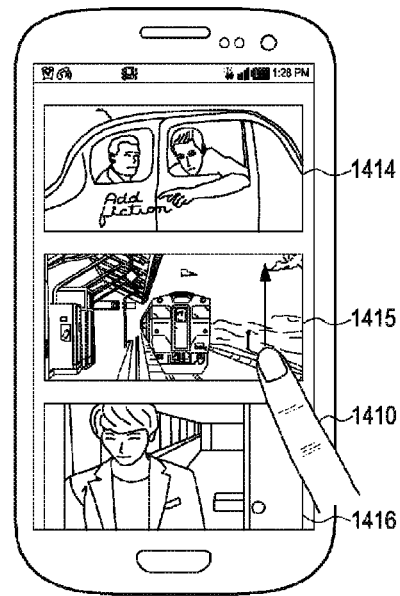
FIG. 14B illustrates the making of a gesture to display at least one object existing beneath a plurality of objects displayed on a touch screen, according to an embodiment of the present invention.

The mobile terminal 100 displays a plurality of objects on the touch screen 190, in step S1310. The objects may include not only images, such as photos, maps, documents and Emails, but also any objects that can be displayed on the touch screen 190. As illustrated in FIG. 14A, the touch screen 190 may display at least one object 1411 to 1413, and a plurality of objects (1414 to 1418 in FIG. 14B) may exist beneath (corresponding to objects beneath the object 1413) of the plurality of objects (1411 to 1413 in FIG. 14A), which are currently displayed on the touch screen 190.

In step S1312, it is determined whether an up-gesture is input. If an up-gesture is not input, the methodology terminates. If a gesture to display at least one object existing beneath is input while a plurality of objects are displayed on the touch screen 190, the mobile terminal 100 may display a plurality of objects determined by the input gesture, in step S1314. The gesture means an action of moving up a finger 1410 to display objects (1414 to 1418 in FIGS. 14B and 14C) existing beneath the objects displayed on the touch screen 190. The speed, at which the plurality of objects are displayed in step S1314, may be proportional to the speed of the gesture. Specifically, if the speed of the gesture is high, the display speed may also be high, and if the speed of the gesture is low, the display speed may also be low. The relationship between the speed of the gesture and the display speed is as shown in Table 2.

In step S1316, it is determined whether the up-gesture is continued. If the up-gesture is not continued, display of the objects is continued at step S1314. If the user desires to continuously input the gesture, it is determined whether the up-gesture is possible in step S1318. If the up-gesture is possible, the methodology returns to step S1312 where the further up-gesture is input, and additional objects are displayed in step S1314. The gesture may be repeatedly made until objects (1416 to 1418 in FIG. 14C) existing in the lowermost side are displayed.

If the gesture is not possible, the mobile terminal 100 may provide at least one of visual feedback, haptic feedback, and a sound corresponding thereto, for objects, and display the plurality of objects, in step S1320. If a plurality of objects (1416 to 1418 in FIG. 14C) existing in the lowermost side are displayed with at least one gesture, the gesture can no longer be input. In this case, the mobile terminal 100 may provide at least one of visual feedback, haptic feedback, and the sound corresponding thereto, to the object (1418 in FIG. 14C) existing in the lowermost side among the objects. The visual feedback is a feedback for visually showing the user the bounce effects indicating that there is no more object to be displayed even though a gesture is input. This visual feedback may include transforming a bottom side 1418a of the object 1418 existing in the lowermost side to be concave. In this case, the controller 110 may determine a point of the finger by which the gesture was made on the touch screen 190, and transform a portion perpendicular to the point of the finger to be most concave. In other words, the controller 110 may determine a starting point, an ending point and a progress direction of the gesture on the touch screen 190, and form a point nearest the starting point to be most concave, on a side of an object located in the opposite direction to the progress direction. For example, as illustrated in FIG. 14D, the bottom side 1418a of the object 1418 displayed on the touch screen 190 may be transformed to be concave such that the bottom side 1418*a* of a portion perpendicular to the point of the finger may be most concave. In other words, the visual feedback may be different depending on the position of the finger being dragged. As illustrated in FIG. 14D, if a gesture is made by a finger on the right side, a point nearest to the starting point where the gesture by the finger starts may be formed to be most concave on the bottom side of the object (e.g., the object 1418 existing in the lowermost side) located in the opposite direction to the progress direction of the finger. In addition, a side most nearest the left and right sides of the finger position may be concave. As described above, the mobile terminal 100 may transform the bottom side of the object to be concave, or transform at least one other side of the object to be concave, to provide a visual feedback. This visual feedback may be provided until the touch by the input gesture is terminated. Specifically, the visual feedback may be provided while the touch with the touch screen 190 by the gesture continues, and if the touch is released from the touch screen 190, the visual feedback may also be terminated and the objects may be displayed as illustrated in FIG. 14E. Furthermore, if objects existing in the lower side can no longer be displayed, the mobile terminal 100, while or before/after providing the visual feedback, may control vibrations and output the sound corresponding thereto, in response to a predetermined haptic feedback.

Figure 14C:
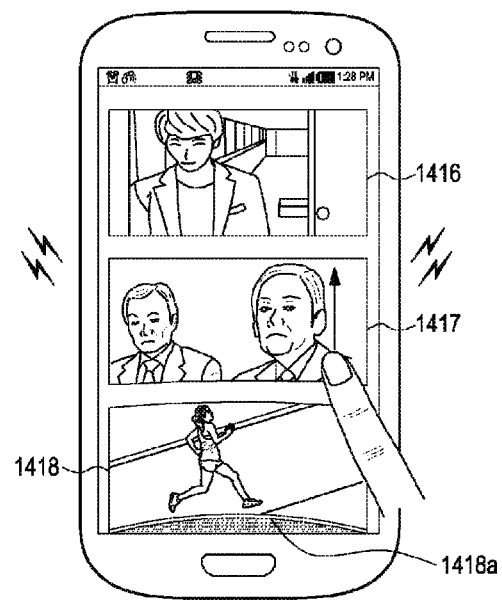
FIG. 14C illustrates that at least one object existing beneath a plurality of objects displayed on a touch screen can no longer be displayed, according to an embodiment of the present invention.
Figure 14D:
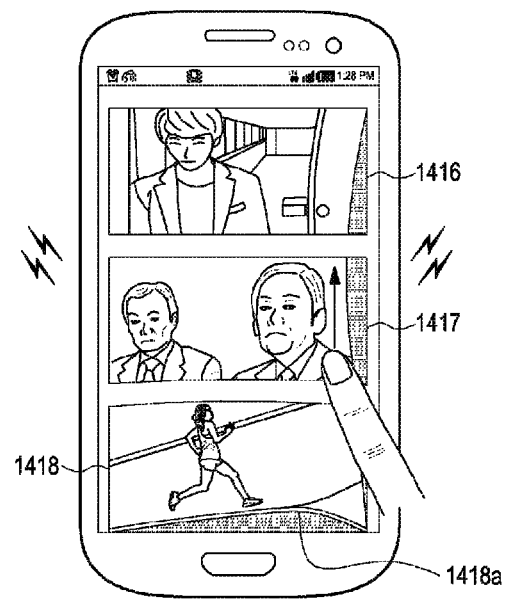
FIG. 14D illustrates that at least one object existing beneath a plurality of objects displayed on a touch screen can no longer be displayed, according to another embodiment of the present invention.
Figure 14E:
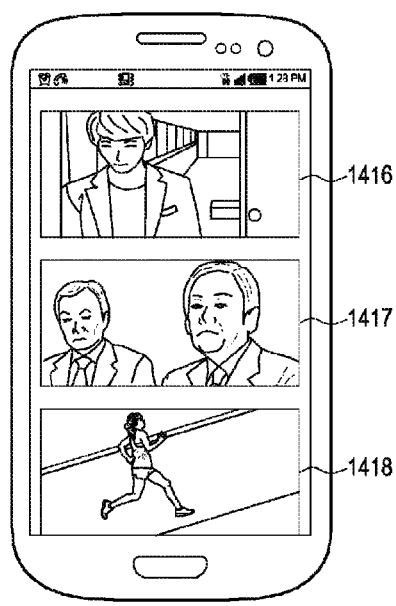
FIG. 14E illustrates the displaying of at least one object existing in the lowermost side when a gesture to display at least one object existing beneath a plurality of objects displayed on a touch screen can no longer be made, according to an embodiment of the present invention.
Figure 17:
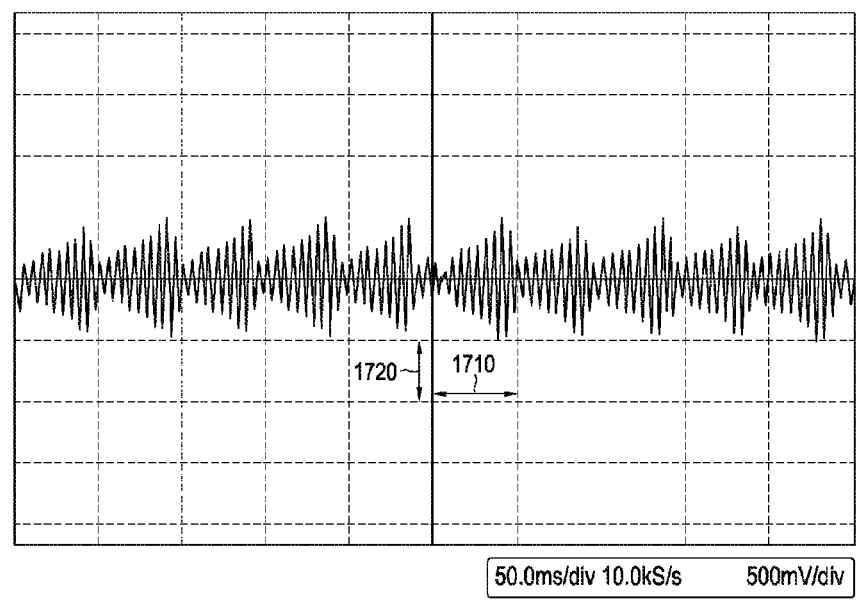
FIG. 17 illustrates a waveform of a haptic pattern used when at least one object existing beneath or above a plurality of objects displayed on a touch screen can no longer be displayed, according to an embodiment of the present invention.

As illustrated in FIG. 14C, if the bottom side 1418*a* of the object 1418 in FIG. 14C is transformed to be concave by the gesture, a waveform of a predetermined haptic feedback, which is used when a gesture can no longer be made, may be as shown in FIG. 17.

Figure 15:
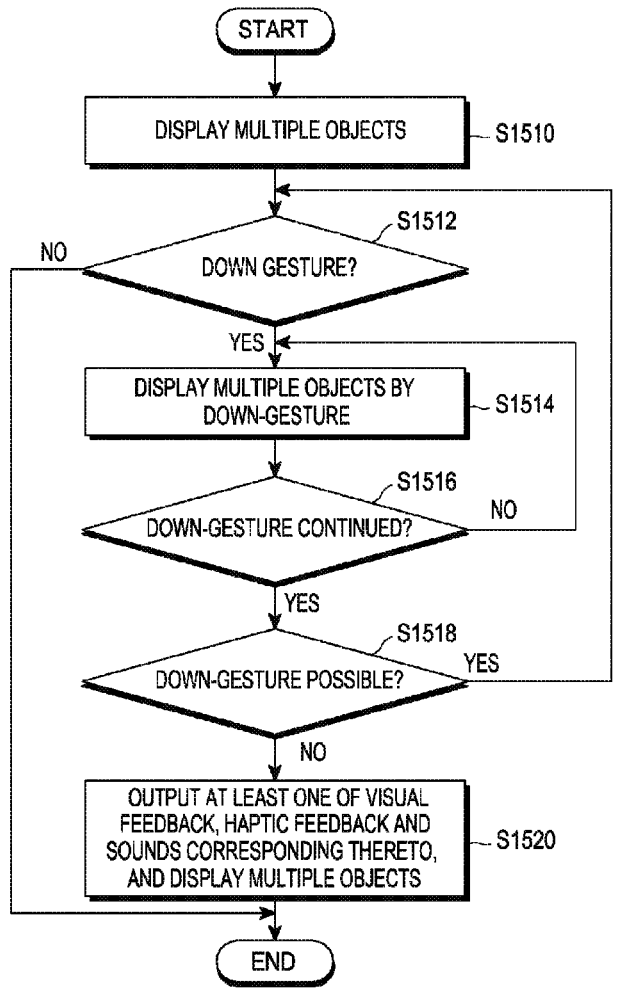
FIG. 15 is a flowchart illustrating a method for providing visual feedback and haptic feedback when a gesture is made to display at least one object existing above a plurality of objects displayed on a touch screen, according to an embodiment of the present invention.

FIG. 15 is a flowchart illustrating a method for providing visual feedback and haptic feedback when a gesture is made to display at least one object existing above a plurality of objects displayed on a touch screen, according to an embodiment of the present invention. FIGS. 16A to 16E illustrate a process of making a gesture to display at least one object existing above a plurality of objects displayed on a touch screen, according to an embodiment of the present invention.

Figure 16A:
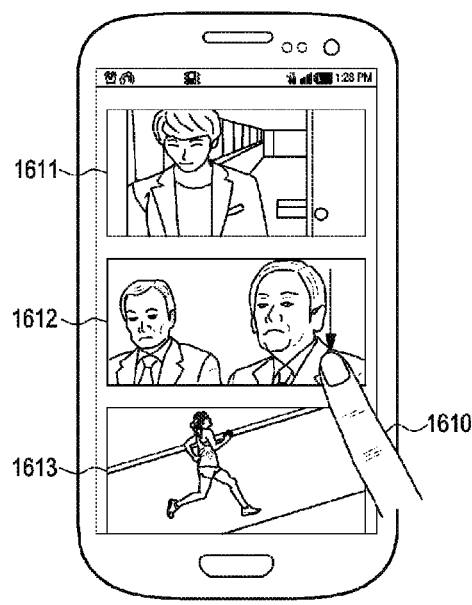
FIG. 16A illustrates the displaying of a plurality of objects on a touch screen of a mobile terminal, according to an embodiment of the present invention.
Figure 16B:
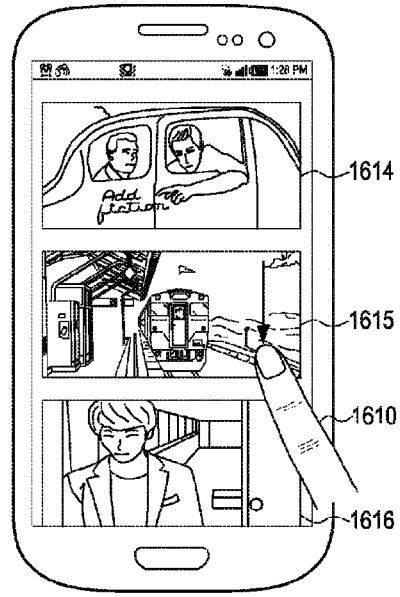
FIG. 16B illustrates the making of a gesture to display at least one object existing above a plurality of objects displayed on a touch screen, according to an embodiment of the present invention.

In step S1510, the mobile terminal 100 displays a plurality of objects on the touch screen 190. The objects may include not only images, such as photos, maps, documents, and Emails, but also any objects that can be displayed on the touch screen 190. As illustrated in FIG. 16A, the touch screen 190 may display at least one object 1611 to 1613, and a plurality of objects (1614 to 1618 in FIG. 16B) may exist above (corresponding to objects over the object 1611) of the plurality of objects (1611 to 1613 in FIG. 16A), which are currently displayed on the touch screen 190.

In step S1512, it is determined whether a down-gesture is input. If a down gesture is not input the methodology terminates. If a gesture to display at least one object existing above is input while a plurality of objects are displayed on the touch screen 190, the mobile terminal 100 may display a plurality of objects determined by the input gesture, in step S1514. The gesture means an action of moving down an input unit (e.g., a finger 1610) to display objects (1614 to 1618 in FIG. 16B) existing above the objects displayed on the touch screen 190. The speed at which the plurality of objects are displayed in step S1514, may be proportional to the speed of the gesture. Specifically, if the speed of the gesture is high, the display speed may also be high, and if the speed of the gesture is low, the display speed may also be low.

In step S1516, it is determined whether the down-gesture is continued. If the down-gesture is not continued, the methodology returns to step S1514, where display of the objects continues. If the user desires to continuously input the gesture, it is determined whether the down-gesture is possible, in step S1518. If the down-gesture is possible, the methodology returns to step S1512, where the further down-gesture is determined and the further objects are displayed in step S1514. The gesture may be repeatedly made until objects (1614, 1617 and 1618 in FIG. 16C) existing in the uppermost side are displayed.

If the gesture is not possible, the mobile terminal 100 may provide at least one of visual feedback, haptic feedback and a sound corresponding thereto, for objects, and display the plurality of objects, in step S1520. If a plurality of objects (1614, 1617 and 1618 in FIG. 16C) existing in the uppermost side are displayed with at least one gesture, the gesture can no longer be input. In this case, the mobile terminal 100 may provide at least one of visual feedback, haptic feedback and the sound corresponding thereto, to the object (1618 in FIG. 16C) existing in the uppermost side among the objects. The visual feedback is a feedback for visually showing the user the bounce effects indicating that there is no more object to be displayed even though a gesture is input. This visual feedback may include forming or transforming a upper side 1618*a* of the object 1618 existing in the uppermost side to be concave. For example, as illustrated in FIG. 16D, the ceiling side 1618*a* of the object 1618 displayed on the touch screen 190 may be transformed to be concave inward. More specifically, if a gesture is input, the controller 110 may determine a starting point, an ending point and a progress direction of the gesture, and form a point nearest the starting point to be most concave, on a side of an object located in the opposite direction to the progress direction. For example, since the gesture of the finger 1610 is inclined to the right side, the ceiling side 1618*a* may be transformed to be most concave. In this way, the mobile terminal 100 may transform the ceiling side of the object to be concave, or transform at least one other side of the object to be concave, to provide a visual feedback. This visual feedback may be provided until the touch by the input gesture is terminated. Specifically, the visual feedback may be provided while the touch with the touch screen 190 by the gesture continues, and if the touch is released from the touch screen 190, the visual feedback may also be terminated and the objects may be displayed as illustrated in FIG. 16E. Furthermore, if objects existing in the upper side can no longer be displayed, the mobile terminal 100, while or before/after providing the visual feedback, may control vibrations and output the sound corresponding thereto, in response to a predetermined haptic feedback.

Figure 16C:
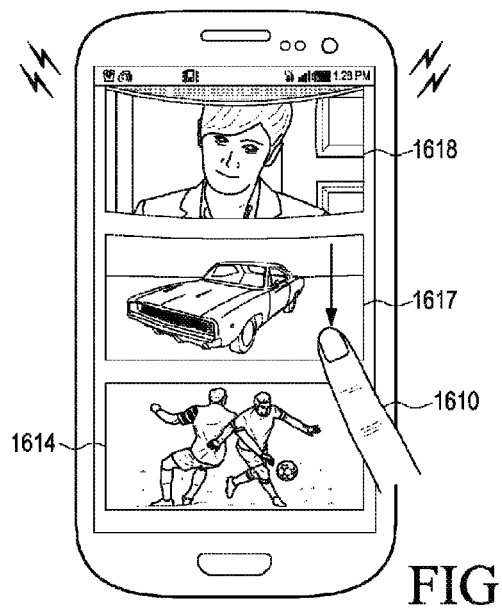
FIG. 16C illustrates that at least one object existing above a plurality of objects displayed on a touch screen can no longer be displayed, according to an embodiment of the present invention.
Figure 16D:
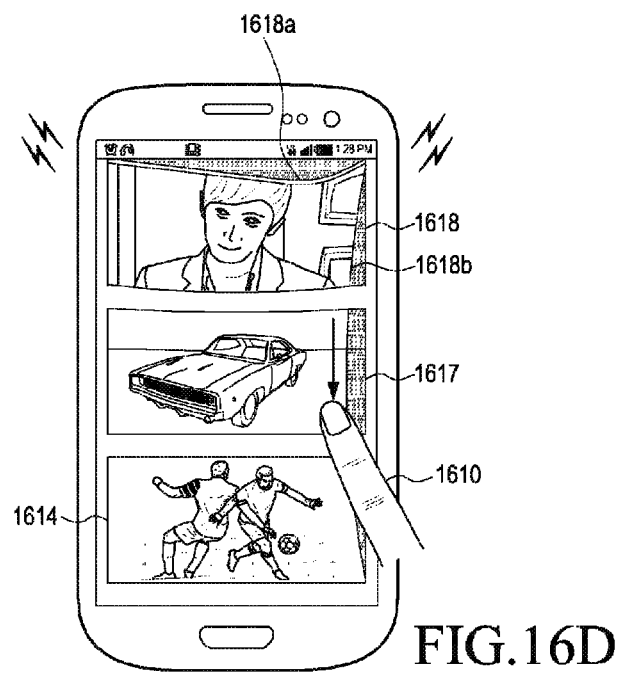
FIG. 16D illustrates that at least one object existing above a plurality of objects displayed on a touch screen can no longer be displayed, according to another embodiment of the present invention.
Figure 16E:
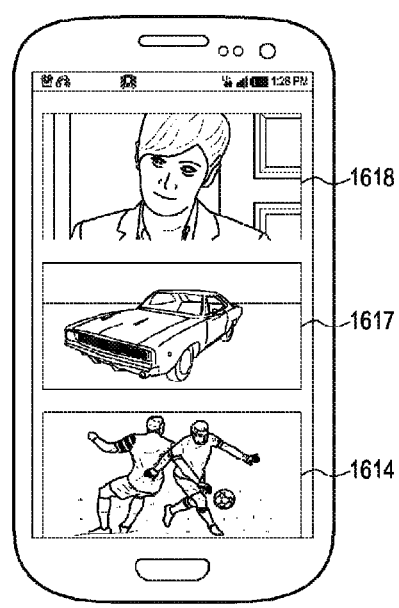
FIG. 16E illustrates the displaying of at least one object existing in the uppermost side when at least one object existing above a plurality of objects displayed on a touch screen can no longer be displayed, according to an embodiment of the present invention.

As illustrated in FIG. 16C, if the ceiling side 1618*a* of the object 1618 in FIG. 16C is transformed to be concave by the gesture, a waveform of a predetermined haptic feedback, which is used when a gesture can no longer be made, may be as shown in FIG. 17.

FIG. 17 illustrates a waveform of a haptic pattern used when at least one object existing beneath or above a plurality of objects displayed on a touch screen can no longer be displayed, according to an embodiment of the present invention.

The waveform of the predetermined haptic pattern illustrated in FIG. 17 may be applied in common to an embodiment of FIGS. 13 and 14A to 14E, and another embodiment of FIGS. 15 and 16A to 16E.

Referring to FIG. 17, the waveform of the haptic pattern may be used when a gesture to display at least one object beneath or a gesture to display at least one object above can no longer be made while a plurality of objects are displayed on a touch screen, according to an embodiment of the present disclosure. For the waveform of the haptic pattern, its vibrations corresponding to a voltage of 1V may be periodic in units of 50 ms. These vibrations may occur when the user does not take the input unit (e.g., the finger) off from the touch screen 190 (or keeps touching the touch screen 190 with the input unit) after making a gesture on the touch screen 190. In other words, the waveform in FIG. 17 may be a waveform for a tactile haptic pattern that provides a bouncing feeling when a gesture to display at least one object on the touch screen 190 can no longer be made. In FIG. 17, the horizontal axis (i.e., X-axis) is a time axis representing the vibration time, and its unit 1710 is 50 ms. The vertical axis (i.e., Y-axis) represents the vibration intensity, and its unit 1720 is 500 mV. The waveform of a haptic pattern used when a gesture to display at least one object on a touch screen can no longer be made according to an exemplary embodiment of the present disclosure is not limited to FIG. 17. In addition to the waveform of FIG. 17, other various waveforms having different vibration cycle and intensity may be stored in the mobile terminal 100, and other haptic patterns may be generated and stored by combining pre-stored waveforms.

Embodiments of the present invention may be implemented by hardware, software, or a combination thereof. The software may be stored in volatile or non-volatile storage (e.g., erasable or re-writable ROM), memory (e.g., RAM, memory chip, memory device, or memory Integrated Circuit (IC)), or optically or magnetically recordable machine (e.g., computer)-readable storage media (e.g., Compact Disk (CD), Digital Versatile Disk (DVD), magnetic disk, or magnetic tape). A memory that can be included in a mobile terminal may be a typical example of machine-readable storage media suitable to store a program or programs including instructions for implementing embodiments of the present invention. Therefore, embodiments of the present invention may include a program including codes for implementing the apparatus or method as defined by the appended claims and their equivalents, and machine-readable storage media storing the program. The program may be electronically carried by any media such as communication signals, which are transmitted through wired/wireless connections.

The mobile terminal may receive and store the program from a program server to which it is connected by wires or wirelessly. The program server may include a memory for storing a program including instructions for implementing the haptic control method, and information needed for the haptic control method, a communication unit for performing wired/wireless communication with the mobile terminal, and a controller for transmitting the program to the mobile terminal at the request of the mobile terminal or automatically.

As is apparent from the foregoing description, according to an embodiment of the present invention, the mobile terminal may control the display speed for objects displayed on the touch screen, and provide visual and/or haptic feedback to the user when bouncing effects occur as the user moves a selected object up, down, left or right, thereby improving the user's convenience.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for providing visual and haptic feedback in a mobile terminal, the method comprising the steps of:
    detecting at least one first touch on an object displayed on a touch screen;
    scrolling and displaying the object based on movement of the first touch;
    detecting an object hovering over the touch screen while scrolling and displaying the object;
    determining a distance between the touch screen and the detected object hovering over the touch screen;
    varying a speed of the scrolling based on a change of the distance between the touch screen and the detected object hovering over the touch screen; and
    displaying the object based on the varied speed of the scrolling,
    further comprising:
    if the determined distance is a first distance, scrolling and displaying the object based on a first speed; and
    if the determined distance is a second distance, scrolling and displaying the object based on a second speed,
    wherein the first distance is larger than the second distance, and the first speed is larger than the second speed.

2. The method of claim 1, wherein the visual feedback comprises an operation in which at least one of a vibrating visual feedback and a rippling visual feedback begins at an object where at least one second touch is detected, and wherein the haptic feedback is output corresponding to the visual feedback.

3. The method of claim 2, wherein the haptic feedback has a waveform that vibrates at a vibration intensity corresponding to a voltage of 1.5V for 50 ms, vibrates at a vibration intensity corresponding to a voltage of 500 mV for 70 ms, and then, vibrates again at a vibration intensity corresponding to a voltage of 1.5V for 50 ms after a lapse of 50 ms.

4. The method of claim 1, wherein scrolling and displaying the object comprises transforming and displaying the object in response to a direction of the movement of the first touch.

5. The method of claim 4, wherein if the object is no longer scrolled in response to movement of the first touch, the visual feedback is provided, which transforms, to be concave, one of the four sides of the object that is opposite a direction of the movement of the first touch.

6. The method of claim 5, wherein the haptic feedback is output, which corresponds to the visual feedback that transforms one of the four sides of the object to be concave.

7. The method of claim 6, wherein the visual feedback transforms one of the four sides of the object to be concave based on both vertices of the one side.

8. The method of claim 5, wherein the predetermined haptic pattern has a waveform that repeats for a predetermined time a cycle in which the waveform vibrates at a vibration intensity corresponding to a voltage of 1V for 50 ms.

9. The method of claim 1, further comprising:
    detecting at least one second touch on the displayed object;
    displaying visual feedback on the touch screen based on the second touch; and
    outputting haptic feedback corresponding to a predetermined haptic pattern using a vibration motor.

10. The method of claim 9, wherein the at least one first touch and the at least one second touch are input through an input unit that is in communication with the mobile terminal.

11. The method of claim 10, further comprising transmitting a control signal corresponding to the haptic feedback to the input unit.

12. The method of claim 9, wherein each of the at least one first touch and the at least one second touch comprise multiple touches;
wherein the object is zoomed in or out in response to the movement of the first touch; and wherein if the object is no longer zoomed in or out in response to movement of the second touch, the visual feedback is provided that transforms at least one side of the object to be convex or concave.

13. The method of claim 12, wherein outputting the haptic feedback comprises outputting the haptic feedback corresponding to the visual feedback that transforms the at least one side of the object to be convex or concave.

14. The method of claim 13, wherein the haptic feedback has a waveform that vibrates at a vibration intensity corresponding to a voltage of 2V to 2.5V for 70 ms, stops the vibration for 50 ms, and then, vibrates again at a vibration intensity corresponding to a voltage of 2V for 400 ms.

15. The method of claim 12, wherein the at least one side of the object is transformed to be concave in response to a distance between a touch position where the second touch is detected and a side opposite a direction of the movement of the second touch.

16. The method of claim 12, wherein the at least one side of the object is transformed to be convex in response to a distance between a touch position where the second touch is detected and a side in a direction of the movement of the second touch.

17. The method of claim 1, wherein the object hovering over the touch screen is a user's finger, and the hovering is an input by the user's finger.

18. A mobile terminal for providing visual and haptic feedback, the mobile terminal comprising:
a vibration motor configured to output vibrations;
a touch screen configured to display an object; and
a controller configured to:
detect at least one first touch on an object displayed on the touch screen,
scroll and display the object based on movement of the first touch,
detect an object hovering over the touch screen while scrolling and displaying the object,
determine a distance between the touch screen and the detected object hovering over the touch screen,
vary a speed of the scrolling based on a change of the distance between the touch screen and the detected object hovering over the touch screen, and
display the object based on the varied speed of the scrolling,
further comprising;
if the determined distance is a first distance, scrolling and displaying the object based on a first speed; and
if the determined distance is a second distance, scrolling and displaying the object based on a second speed,
wherein the first distance is larger than the second distance, and the first speed is larger than the second speed.

19. The mobile terminal of claim 18, further comprising a transceiver for transmitting a control signal including the predetermined haptic pattern to an input unit that provides a touch to the touch screen.

20. The mobile terminal of claim 18, wherein if the object is no longer scrolled in response to movement of the first touch, the controller transforms, to be concave, one of four sides of the object in a direction that is opposite to the movement of the first touch.

21. The mobile terminal of claim 20, wherein the controller determines a starting point, an ending point, and a progress direction of the movement of the second touch, and transforms a point nearest the starting point to be most concave, on a side of the object that is opposite to the progress direction.

22. The mobile terminal of claim 20, wherein the controller fixes positions of both vertices of the one side so that the positions may remain unchanged.

23. The mobile terminal of claim 18, further comprising:
detecting at least one second touch on the displayed object;
displaying visual feedback on the touch screen based on the second touch; and
outputting haptic feedback corresponding to a predetermined haptic pattern using a vibration motor.

24. The mobile terminal of claim 23, wherein if the second touch is a touch made to select an object, the controller determines a touch point, and provides to the touch screen visual feedback that spreads rippling of the touch screen outwardly from the touch point.

25. The mobile terminal of claim 23, wherein if the second touch is a touch to zoom in or out an object and the object is no longer zoomed in or out in response to movement of the second touch, the controller provides to the touch screen visual feedback that transforms at least one side of the object to be convex or concave, and outputs the haptic feedback corresponding to the visual feedback to the vibration motor.

26. The mobile terminal of claim 25, wherein one side of the object is transformed to be convex in response to a distance between a touch position where the second touch is detected and a side in a direction of the movement of the second touch.

27. The mobile terminal of claim 25, wherein one side of the object is transformed to be concave in response to a distance between a touch position where the second touch is detected and a side that is opposite a direction of the movement of the second touch.

28. The mobile terminal of claim 27, wherein the controller fixes positions of four vertices located at corners of the object so that the positions remain unchanged.

29. The mobile terminal of claim 18, wherein the object hovering over the touch screen is a user's finger, and the hovering is an input by the user's finger.

* * * * *